(12) United States Patent
Landers et al.

(10) Patent No.: US 8,034,848 B2
(45) Date of Patent: Oct. 11, 2011

(54) USE OF LOW-VISCOSITY AQUEOUS HOT-CURE FLEXIBLE POLYURETHANE FOAM STABILIZER SOLUTIONS CONTAINING POLYETHERSILOXANES IN THE PRODUCTION OF HOT-CURE FLEXIBLE POLYURETHANE FOAMS

(75) Inventors: Ruediger Landers, Essen (DE); Berend-Jan De Gans, Essen (DE)

(73) Assignee: Evonik Goldschmidt GmbH, Essen (DE)

( * ) Notice: Subject to any disclaimer, the term of this patent is extended or adjusted under 35 U.S.C. 154(b) by 879 days.

(21) Appl. No.: 11/839,748

(22) Filed: Aug. 16, 2007

(65) Prior Publication Data

US 2009/0012197 A1    Jan. 8, 2009

(30) Foreign Application Priority Data

Aug. 18, 2006  (DE) .................... 10 2006 038 661

(51) Int. Cl.
  *C08G 77/46* (2006.01)
(52) U.S. Cl. ............. 521/112; 252/182.24; 252/182.29; 252/182.32; 521/114; 521/170
(58) Field of Classification Search ............. 252/182.24, 252/182.29, 182.32; 521/112, 114, 170
See application file for complete search history.

(56) References Cited

U.S. PATENT DOCUMENTS

| 4,751,251 | A |   | 6/1988  | Thornsberry    |         |
|-----------|---|---|---------|----------------|---------|
| 4,795,763 | A | * | 1/1989  | Gluck et al.   | 521/99  |
| 5,691,392 | A | * | 11/1997 | Okoroafor et al. | 521/112 |

* cited by examiner

*Primary Examiner* — John Cooney
(74) *Attorney, Agent, or Firm* — Frommer Lawerence & Haug LLP

(57) ABSTRACT

The subject matter of the present invention relates to a low-viscosity aqueous hot-cure flexible polyurethane foam stabilizer solution which can be used in the production of hot-cure flexible polyurethane foams, wherein the low-viscosity aqueous hot-cure flexible polyurethane foam stabilizer solution comprises the following components: $\geq 40\%$ to $\leq 70\%$ by weight of polyethersiloxane, $\geq 0.5\%$ to $\leq 20\%$ by weight of organic surfactant, $\geq 10\%$ by weight of water, $\geq 0\%$ by weight of organic solvent additions, in which the polyethersiloxane has the following formula (I) $-R^1-Si(CH_3)_2O-[Si(CH_3)(OSi(CH_3)_2R^0)O-]_u-[Si(OSi(CH_3)_2R^0)_2O-]_v-[Si(CH_3)_2O-]_w-[SiCH_3R^2O-]_x-[SiCH_3R^3O-]_y-[SiCH_3R^4O]_z-[SiR_3R^4O]_t-Si(CH_3)_2-R^5$ (I).

32 Claims, 1 Drawing Sheet

USE OF LOW-VISCOSITY AQUEOUS HOT-CURE FLEXIBLE POLYURETHANE FOAM STABILIZER SOLUTIONS CONTAINING POLYETHERSILOXANES IN THE PRODUCTION OF HOT-CURE FLEXIBLE POLYURETHANE FOAMS

This application claims benefit under 35 U.S.C. 119(a) of German patent application DE 10 2006 038 661.2 filed on Aug. 18, 2006

Any foregoing applications, including German patent application DE 10 2006 038 661.2, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

The subject matter of the present patent application relates to low-viscosity aqueous hot-cure flexible polyurethane foam stabilizer solutions containing polyethersiloxanes and to their use in the production of hot-cure flexible polyurethane foams, and also to the hot-cure flexible polyurethane foam produced by means of the hot-cure flexible polyurethane foam stabilizer solution.

Flexible polyurethane foams presently find diverse use in the manufacture of mattresses, upholstered furniture or automobile seats. They are produced by reaction of isocyanates with polyols. In the course of the production of hot-cure flexible polyurethane foams, foam stabilizers serve to stabilize the expanding foam. In the absence of these stabilizers the surface tension of the reaction mixture during hot-cure flexible polyurethane foam production is too high, meaning that the hot-cure flexible polyurethane foam would collapse in the course of production.

Polyethersiloxanes in particular are used for stabilizing hot-cure flexible polyurethane foams.

EP-A1 0 520 392 (U.S. Pat. No. 5,472,987) describes a surface-active composition for flexible polyurethane foams, that composition being a mixture comprising a component A) containing 99.98% to 90% by weight of a surface-active "nonhydrolyzing" siloxane polyether, which can be used in the production of conventional flexible polyurethane foams, said siloxane polyether containing siloxane chains with at least 26 Si atoms without capped end groups; and a component B) containing 0.02% to 10% by weight of a salt of organic acids having the general formula $A_aM_m$; the weight figures are based on the total weight of the siloxane polyether and of the salt of the organic acid.

A very high concentration of polyethersiloxane in the foam stabilizer mixture leads typically to an increase in the viscosity. A disadvantage is that a high viscosity is detrimental to good flow behavior on the part of the foam stabilizer mixture during processing. A further disadvantage is that rapid and at the same time homogeneous distribution of such a foam stabilizer mixture in the hot-cure flexible polyurethane foam reaction mixture is not adequately possible.

The reason why the high viscosity of polyethersiloxane-containing foam stabilizer mixtures is a disadvantage particularly in the context of the production of hot-cure flexible polyurethane foam is that it hinders pumping in the mixing head or even makes such pumping impossible. Within the art, a viscosity of 5000 mPa·s is regarded as the upper limit. Consequently, foam stabilizer mixtures of this kind are mixed with organic solvents, such as low molecular mass diols, exemplified by ethylene glycol, dipropylene glycol or diethylene glycol. In some cases short-chain polyethers, vegetable oils or technical solvents, such as propylene carbonate or phthalate compounds, are used as well. The disadvantage of all of these solvents is that they introduce into the hot-cure flexible polyurethane foam an extraneous substance not actually required for the foam's production. Furthermore, to a greater or lesser extent, these substances are environmentally hazardous and combustible.

It is an object of the present invention, to provide a low-viscosity foam stabilizer mixture containing a high concentration of polyethersiloxane that avoids at least one of the aforementioned disadvantages.

The object of the present invention is achieved by means of a low-viscosity aqueous hot-cure flexible polyurethane foam stabilizer solution which can be used in the production of hot-cure flexible polyurethane foams, wherein the low-viscosity aqueous hot-cure flexible polyurethane foam stabilizer solution comprises the following components:

$\geq 40\%$ to $\leq 70\%$ by weight of polyethersiloxane,
$\geq 0.5\%$ to $\leq 20\%$ by weight of organic surfactant,
$\geq 10\%$ by weight of water,
$\geq 0\%$ by weight of organic solvent additions, in which the polyethersiloxane has the following formula (I)

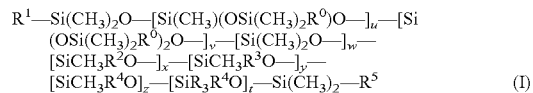

in which
$R^0$=—O—[Si(CH$_3$)$_2$O—]$_w$—[SiCH$_3$R$^2$O—]$_x$—[SiCH$_3$R$^3$O—]$_y$—[SiCH$_3$R$^4$O]$_z$—Si(CH$_3$)$_2$—R$^5$,
$R^1$, $R^2$, $R^3$, $R^4$ and $R^5$=identically to or differently from one another in each case an alkyl or aryl radical of 1 to 12 carbon atoms or in each case —CH$_2$—R$^6$ or —CH$_2$—CH$_2$—R$^6$ or polyalkylene oxide polyether of the formula (II)

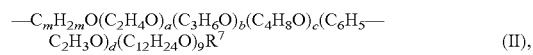

$R^6$=H, —C$_6$H$_5$, —CN, -alkyl with C$_1$ to C$_{10}$, —CH—CH$_2$O (epoxide ring), -alkyl-OH, -aryl-OH, —Cl, —OH, —R$^8$—O—R$^9$, —R$^8$—O—CO—R$^9$ or a divalent bridge to a further siloxane radical, selected from the group consisting of alkylene, —R$^8$—O—R$^9$—, —R$^8$—COO—R$^9$, —R$^8$—O—R$^9$—O—R$^8$—, —R$^8$—COO—R$^9$—OOC—R$^8$—, —R$^8$—OOC—R$^9$—COO—R$^8$—,
$R^7$=H, alkyl, acyl, acetyl or aryl radical, alkyl- or aryl-urethane group or a divalent bridge to a further siloxane radical, selected from the group consisting of alkylene, —R$^8$—O—R$^9$—, —R$^8$—COO—R$^9$, —R$^8$—O—R$^9$—O—R$^8$—, —R$^8$—COO—R$^9$—OOC—R$^8$— —R$^8$—OOC—R$^9$—COO—R$^8$—,
$R^8$=alkyl- or aryl-,
$R^9$=alkyl- or aryl-,
u=0 to 5,
v=0 to 5,
t=0 to 15,
w=15 to 130,
x=0 to 15,
y=0 to 15,
z=0 to 15,
m=0 to 4,
a=$\geq 0$ to $\leq 160$,
b=0 to $\leq 140$,
c=$\geq 0$ to $\leq 50$, g=≧0 to ≦50,
d=≧0 to ≦50, it being the case that a+b+c+d+g≧10, with the proviso that x+y+z+t≧3, and that at least one substituent $R^1$, $R^2$, $R^3$, $R^4$, and $R^5$ is a polyether of the formula II, the weight fraction of the aforementioned components being selected such that the overall weight fraction of the components does not exceed 100% by weight, based on the hot-cure flexible polyurethane foam stabilizer solution.

In terms of the distribution of the monomer units to the polymer chain, the polyether of formula II may be random, blockwise or changing with a gradient.

The polyethersiloxane component in the hot-cure flexible polyurethane foam stabilizer solution may also be composed of two or more polyethersiloxanes of formula I.

The weight fraction of the aforementioned components, unless specified otherwise, is selected such that the total weight fraction of the components does not exceed 100% by weight, based on the hot-cure flexible polyurethane foam stabilizer solution.

Unless specified otherwise, the weight figures are based on the total weight of the hot-cure flexible polyurethane foam stabilizer solution.

Unless specified otherwise, the respective components may take the form of individual components or of a mixture. It is in fact preferred for the polyethersiloxane to constitute a mixture. It may likewise be preferable for the surfactant to take the form of a surfactant mixture.

The polyethersiloxane, organic surfactant, water, organic solvent additions, and, where appropriate, further additives, compounds which can be used in accordance with the invention, are in each case different from one another. By way of example, the surfactants comprise no inventively useful polyethersiloxane of the formula I or the organic solvent additions comprise no organic surfactant, and vice versa.

It has surprisingly been found that the hot-cure flexible polyurethane foam stabilizer solutions of the invention exhibit a much lower viscosity than the otherwise identical compositions from which surfactant is absent.

The hot-cure flexible polyurethane foam stabilizer solutions of the invention may contain preferably ≧10% to ≦60% by weight of water, in particular ≧15% to ≦59.5% by weight of water and ≧0% to ≦20% by weight of organic solvent additions.

The hot-cure flexible polyurethane foam stabilizer solutions of the invention may have a viscosity which is at least 10%, preferably at least 20%, more preferably at least 30%, more preferably still at least 40%, with further preference at least 50%, and most preferably at least 60% lower than that of the otherwise identical compositions from which surfactant is absent.

It is particularly preferred if the low-viscosity aqueous hot-cure flexible polyurethane foam stabilizer solution of the invention has a viscosity of ≦5000 mPa·s.

It is even more preferred if the low-viscosity aqueous hot-cure flexible polyurethane foam stabilizer solution of the invention containing ≧40% to ≦50% by weight of polyethersiloxane, based on the total weight of the hot-cure flexible polyurethane foam stabilizer solution, has a viscosity which lies within the range from ≧0.05 Pa·s to ≦3 Pa·s, preferably ≧0.01 Pa·s to ≦2 Pa·s, and more preferably ≧0.15 Pa·s to ≦1 Pa·s.

It is also preferred if the low-viscosity aqueous hot-cure flexible polyurethane foam stabilizer solution of the invention containing ≧50% to ≦65% by weight of polyethersiloxane, based on the total weight of the hot-cure flexible polyurethane foam stabilizer solution has a viscosity which lies within the range from ≧0.1 Pa·s to ≦5 Pa·s, preferably ≧0.3 Pa·s to ≦4.5 Pa·s, and more preferably ≧0.4 Pa·s to ≦4 Pa·s As organic solvent additions it is possible to use solvents selected from the group encompassing dipropylene glycol, butyl diglycol, ethylene glycol, diethylene glycol, propylene glycol, phthalates, polyethers, animal and vegetable oils, mineral oils and/or antifreeze agents in liquid form.

With particular preference the organic solvent additions comprise an antifreeze agent selected from the group encompassing dipropylene glycol and/or propylene glycol.

In accordance with a further embodiment of the present invention it may also be the case that no organic solvents are added to the low-viscosity aqueous hot-cure flexible polyurethane foam stabilizer solution.

For the skilled worker it is obvious that the compounds used in accordance with the invention are present in the form of a mixture whose distribution is governed essentially by the laws of statistics. The values of x, y, z, t, u, v, w, m, a, b, c, d and/or g therefore correspond to average values.

With preference in accordance with the invention it is possible for $R^1$ and $R^5$ to be =identically to or differently from one another in each case methyl, ethyl or propyl. With particular preference $R^1$ and $R^5$=methyl.

The value t can be preferably 2 to 15 and more preferably 4 to 13 or 0.

The value u can be preferably 0 to 4 and more preferably 1 to 2 or 0.

The value v can be preferably 0 to 4 and more preferably 1 to 2 or 0.

The value w can be 20 to 120, in particular 30 to 110, preferably 40 to 100, more preferably 50 to 95, with particular preference 55 to 90, and very preferably 60 to 85. Alternatively the value w can be preferably 40 to 130 if u+v=0, or w can be preferably 20 to 65 if u+v>0 to ≦1, or w can be preferably 13 to 43 if u+v>1.

The value x can be preferably 2 to 15 and more preferably 4 to 13 or 0.

The value y can be preferably 2 to 15 and more preferably 4 to 13 or 0.

The value z can be preferably 2 to 15 and more preferably 4 to 13 or 0.

The value a can be preferably 1 to 105, more preferably 5 to 100, and most preferably 10 to 90.

The value b can be preferably 1 to 105, more preferably 5 to 100, and most preferably 10 to 90.

The value c can be preferably 1 to 40, more preferably 2 to 30, and most preferably 2 to 20 or 0.

The value d can be preferably 1 to 40, more preferably 2 to 30, and most preferably 2 to 20 or 0.

The value g can be preferably 1 to 40, more preferably 2 to 30, and most preferably 2 to 20 or 0.

The value m can be preferably 1 to 4 and more preferably 2 to 3.

In accordance with one preferred embodiment the polyethersiloxane has the following formula III:

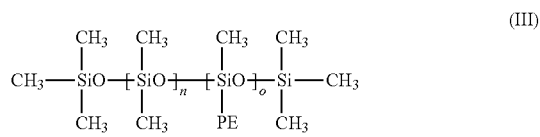

in which
    n=50 to 120, preferably 60 to 100, and more preferably 65 to 90,
    o=3 to 20, preferably 3.5 to 18, and more preferably 4 to 15, and
PE has the following formula IV:

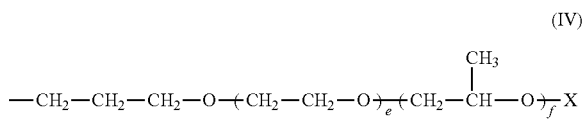

(IV)

in which
    X =H, alkyl, acyl, acetyl or aryl radical,
    e ≧0-100, preferably 1 to 50, more preferably 3 to 40, and with particular preference 5 to 30,
    f ≧0-120, preferably 1 to 50, more preferably 5 to 40, and with particular preference 10 to 30, where e+f≧15.

PE here may also represent a mixture of different polyethers, all of which, however, are shown by formula IV.

The use of water over organic solvents has the further advantage that water is of almost unlimited availability and is nontoxic and nonflammable. On cleaning, furthermore, aqueous solutions are easy to remove and can be disposed of without technical complexity. A further advantage is that the safety provisions for the storage of aqueous solutions are generally less strict. Viewed overall, the use of water as solvent makes it possible to reduce significantly the complexity and, consequently, the production costs of the hot-cure flexible polyurethane foam stabilizer solution of the invention as compared with nonaqueous systems.

In accordance with one preferred embodiment the hot-cure flexible polyurethane foam stabilizer solution of the invention comprises principally water as solvent.

The polyethersiloxanes which can be used in accordance with the invention are prepared in general by the platinum-catalyzed addition reaction of a siloxane containing silane hydrogen atoms with linear polyalkylene oxide polyethers whose linear chain is capped at the reactive end by an alkyleneoxy group, such as allyloxy or vinyloxy, and at the other end by, for example, an alkoxy, aralkyloxy or acyloxy group. The polyethers are prepared by alkoxylating allyl alcohol or higher molecular mass hydroxy-functional allyl or vinyl compounds. Alternatively the OH groups of the polyethers can be endcapped not until after the hydrosilylation. In that case only, or predominantly, uncapped polyethers are used for the hydrosilylation.

The preparation of polyethersiloxanes is set out generally and in patents including EP-A1 0 520 392 and EP-A1 1 350 804, and incoporated here by reference.

The end group of the polyether may, starting from the alkoxylation, initially have a free OH function. This hydroxyl group may also be present at least in part in the polyethersiloxane of the invention. In the case of the preferred polyethersiloxanes, however, the end groups are wholly or at least predominantly endcapped. This can be done by esterification, preferably acetylation, or by etherification, preferably methylation, of the free OH function.

The polyethersiloxanes which can be used in accordance with the invention may in particular be highly stable to hydrolysis, so that the polyethersiloxanes of the invention can be designated hydrolytically stable.

Polyethersiloxanes which can be used in accordance with the invention have a high molecular weight, making their neat viscosity too high for direct processing. The viscosity of neat polyethersiloxanes of this kind may be ≧1000 mPas at 25° C.; for the majority of polyethersiloxanes that are used for stabilizing hot-cure flexible polyurethane foam, the FIGURE is more than 3000 mPa·s at 25° C.; for certain representatives of the polyethersiloxanes of the invention the viscosity may even be just below 6000 mPas at 25° C. In the context of the production of hot-cure flexible polyurethane foam, however, high viscosities constitute a problem, one reason for this being the hindrance to pumping in the mixing head.

In the prior art, therefore, polyethersiloxanes have been diluted with organic solvents, such dilution being associated with the disadvantages described above. Typical polyethersiloxane contents in prior-art hot-cure flexible polyurethane foam stabilizers are 50% to 70% by weight, the remainder being organic solvent.

The use of water as a solvent for polyethersiloxanes used as a stabilizer in hot-cure flexible polyurethane foam was not hitherto considered, since when mixtures of inventive polyethersiloxanes with water are prepared in the concentration range from 40% to 80% by weight of polyethersiloxane, a drastic increase in viscosity is observed in the mixture. The viscosities that come about significantly exceed the level of the polyethersiloxane alone. The reason for the increase in viscosity is the appearance of lyotropically liquid-crystalline phases. These phases are based on a multidimensionally ordered packing of amphiphilic surfactant molecules. Such amphiphilic surfactant molecules also include, for example, the polyethersiloxanes used in accordance with the invention. Lyotropic mesophases of this kind often have an anisotropic distribution of physical properties in space. Depending on the particular mode of packing, the viscosities attain values which completely prohibit flow of the material and hence produce a gellike character.

For instance, an aqueous solution with a polyethersiloxane fraction of 40% by weight, based on the aqueous solution, already has a viscosity of well above 5 Pa·s, and so at this level it is no longer possible to talk of low-viscosity aqueous solutions. Aqueous solutions with a polyethersiloxane fraction of 50% to 70% by weight have even higher viscosities, usually well above 50 Pa·s. The viscosity maximum is reached at approximately 60% by weight polyethersiloxane and 40% by weight water.

On account of their low concentration, aqueous solutions with a polyethersiloxane fraction of <40% by weight are already unsuitable, not least because, when producing hot-cure flexible polyurethane slabstock foams of high density, the increased quantity of water impacts adversely on the pore density distribution and particularly on the foam density, since water functions as a chemical blowing agent for the hot-cure flexible polyurethane foam production. With such a large amount of water in the stabilizer mixture, therefore, it is possible only to produce foams having a relatively low density (a larger quantity of water employed in total). A further drawback of such highly dilute solutions are the transport costs, which are higher than those for more concentrated solutions, and the departure from the established activity level of hot-cure flexible polyurethane foam stabilizers.

Aqueous solutions having a polyethersiloxane content of >80% by weight are likewise unsuitable on account of the high viscosity. An amount of water <20% by weight is inadequate to lower the viscosity sufficiently to give a low-viscosity polyethersiloxane solution. Here, indeed, it is usually the case that the addition of <20% by weight of water produces an increase in the viscosity as compared with the polyethersiloxane alone. Nor does the addition of surfactants alter this situation at all.

Low-viscosity aqueous hot-cure flexible polyurethane foam stabilizer solutions to which the invention gives preference have a polyethersiloxane content of 40% to 70% by weight with a viscosity <5000 mPa·s (5 Pa·s) at 25° C.

It has now been found, surprisingly, that, through the addition of organic surfactants, it is possible to suppress the incidence of the high viscosities at 40 to 70% by weight polyethersiloxane in the aqueous blend. Particular anionic surfactants were very effective in this context.

Preferred aqueous hot-cure flexible polyurethane foam stabilizer solutions have a low viscosity and hence a good rheology. The hot-cure flexible polyurethane foam stabilizer solution in accordance with the present invention may possess a viscosity of $\geq 100$ mPa·s to $\leq 5000$ mPa·s, preferably a viscosity of $\geq 500$ mPa·s to $\leq 3000$ mPa·s, more preferably a viscosity of $\geq 700$ mPa·s to $\leq 2000$ mPa·s, and with particular preference a viscosity of $\geq 900$ Pa·s to $\leq 1800$ mPa·s, as measured in a rotational experiment at 25° C. with a shear rate of 1 $s^{-1}$ using a MCR301 rotational viscometer from Physica (Anton Paar, Ostfildern, Germany). Samples with a viscosity $\geq 100$ mPa·s were measured using a cone/plate geometry (diameter=50.0 mm, angle=0.981°). Samples with a viscosity <100 mPa·s were investigated using a Couette geometry (measuring element diameter=26.66 mm, measuring beaker diameter=28.93 mm, measuring slot width=1.135 mm, measuring slot length=40.014 mm). Since some samples showed structural viscosity characteristics, the samples were first sheared at 1000 $s^{-1}$ for 60 seconds in order to create controlled initial conditions. Thereafter the samples were left for 10 minutes without shearing. During this time it was possible for the structure to develop again. After that the viscosity was measured at a shear rate of 1 $s^{-1}$. For this measurement, shearing was carried out for up to 10 minutes, until an equilibrium was reached. Samples which did not show structural viscosity characteristics were measured directly at 1 $s^{-1}$, without pretreatment, until the equilibrium was reached.

An advantage is that it is possible to obtain stable, storable hot-cure flexible polyurethane foam stabilizer solutions which, in spite of the use of water as a solvent within the claimed ranges, exhibit no tendency, or virtually no tendency, during storage of the hot-cure flexible polyurethane foam stabilizer solution, to form precipitates which settle at the base of a vessel or rise. This is advantageous because in this way it is possible to obtain hot-cure flexible polyurethane foam stabilizer solutions with effective homogeneous distribution of the components.

A further advantage of these aqueous hot-cure flexible polyurethane foam stabilizer solutions of the invention is that they remain clear and homogeneous even on an increase in temperature. Thus in certain cases no changes were observed in the aqueous solutions up to well above 50° C.

A further advantage of the hot-cure flexible polyurethane foam stabilizer solution of the invention is that small amounts can be added, 5% to 10% by weight for example, of a component which functions as an antifreeze agent. Suitable substances are, for example, low molecular mass monools or diols, such as ethanol, isopropanol, dipropylene glycol, ethylene glycol or butyldiglycol. Frost-stabilized aqueous hot-cure flexible polyurethane foam stabilizer solutions of the invention of this kind do not freeze even at −20° C. Freezing of the hot-cure flexible polyurethane foam stabilizer solution is potentially a great problem, since it might happen that only the water freezes and the polyether siloxane might not be incorporated into the ice structure leading to phase separation on thawing. Nevertheless, this problem strongly depends on the cooling speed during freezing and on the chemical structure of the polyether siloxane and is hence not observed for all low viscous hot-cure flexible polyurethane foam stabilizer solutions according to the present invention. However, if a phase separation would be observed it would be eliminable by means of intensive stirring.

However, frost-stabilized aqueous hot-cure flexible polyurethane foam stabilizer solutions are of very high viscosity at low temperatures. This process, however, does not present a problem, since as a general rule the raw materials for hot-cure flexible polyurethane foam production are conditioned to room temperature (23° C.). After the cold, frost-stabilized aqueous hot-cure flexible polyurethane foam stabilizer solution has been warmed to room temperature, the low-viscosity hot-cure flexible polyurethane foam stabilizer solution is obtained again.

A further advantage of the hot-cure flexible polyurethane foam stabilizer solution of the invention is that it is now also possible without problems to add additional substances which are very hydrophilic and which in pure polyethersiloxanes or in solutions of polyethersiloxanes in organic solvents do not dissolve at all or at least only dissolve to a very incomplete extent. These substances are, on the one hand, saltlike additives and, on the other, polyhydroxy-functional additives. As far as the first group is concerned, it is possible for example to add lithium salts, sodium salts or potassium salts. Such salts also act as antifreeze agents. The salts added may also exert a catalytic effect during the production of the hot-cure flexible polyurethane foam. The fraction of the additionally added saltlike compounds, based on the hot-cure flexible polyurethane foam stabilizer solution, can be preferably $\geq 0$% to $\leq 5$% by weight. As electrolytes from the group of the inorganic salts it is possible to employ a wide number of very different kinds of salts. Preferred cations are the alkali metals and alkaline earth metals, preferred anions the halides, sulfates, and carboxylates—such as, for example, alkali metal benzoates or alkali metal acetates.

The hot-cure flexible polyurethane foam stabilizer solution of the invention may with preference additionally comprise polyhydroxy-functional additives which possess a hydroxyl group functionality of $\geq 3$ and which in the context of hot-cure flexible polyurethane foam production act as crosslinkers. The fraction of these polyhydroxy-functional compounds may be between $\geq 0$% and $\leq 10$% by weight, based on the hot-cure flexible polyurethane foam stabilizer solution. The polyhydroxy-functional compounds may with preference be selected from the group encompassing glycerol, trimethylolpropane, pentaerythritol, water-soluble carbohydrates of low molecular mass, especially monomeric or dimeric glycosides, and water-soluble sugar alcohols, preferably sorbitol.

The use of polyhydroxy-functional compounds having a functionality $\geq 3$ may be advantageous, since in the production of the hot-cure flexible polyurethane foam these compounds may be able to contribute to chemical stabilization through increased crosslinking, in addition to the physical stabilization through the polyethersiloxane. When added to aqueous stabilizer solutions of low viscosity, these crosslinkers permit additional control over the foaming behavior, which was hitherto possible only by separate addition of crosslinkers.

Furthermore, the hot-cure flexible polyurethane foam stabilizer solutions of the invention may further comprise typical additives such as catalysts, blowing agents, biocide and/or flame retardants. Biocides may, where appropriate, reduce the risk of microbial contamination of the aqueous hot-cure flexible polyurethane foam solution and hence increase the storage life. Biocides which can suitably be used are, in particular, biocides as recorded in the European Biocidal Products Directive 98/8/EC, List of Substances.

Other additional additives that can be used include antioxidants. These antioxidants may extend the oxidation stability of the aqueous hot-cure flexible polyurethane foam stabilizer solution. Suitable antioxidants are preferably sterically hindered phenols such as, for example, butylated hydroxytoluene (BHT).

As additional additives it is also possible, furthermore, to use buffer substances, in order to set a neutral or slightly basic pH. Suitable buffer substances are preferably phosphate buffers, borate buffers, amino acids, carbonate buffers, or buffers based on the salts of tertiary amines.

Polyethersiloxanes with a broad molecular weight distribution can be used, giving stable hot-cure flexible polyurethane foam stabilizer solutions. In accordance with the present invention it is possible to use polyethersiloxanes which have a molecular weight of 10 000 g/mol to 50 000 g/mol, preferably of 13 000 g/mol to 40 000 g/mol, and more preferably of 15 000 g/mol to 35 000 g/mol.

It has also emerged that hot-cure flexible polyurethane foam stabilizer solutions containing polyethersiloxanes in which the polyether units possess a molar mass of 500 g/mol to 7000 g/mol, preferably 1000 g/mol to 6000 g/mol, more preferably 2000 g/mol to 5000 g/mol, have good product properties in terms of stability of the solution and/or concentration distribution of the polyethersiloxane component. It is therefore particularly preferred for at least one polyether unit to have an average molar mass of $Mn \geq 2100$ g/mol.

The fraction of ethylene oxide in a polyether unit that can be used with preference in accordance with the invention may be 10% to 100% by weight, the amount of propylene oxide then being adapted accordingly; in other words at 10% by weight ethylene oxide, the propylene oxide fraction in the polyether unit is 90% by weight, and, if the ethylene oxide content is 100% by weight, the fraction of propylene oxide in the polyether unit accounts for 0% by weight.

In one preferred embodiment of the present invention, however, the fraction of propylene oxide in the polyether unit may also be 10% to 100% by weight, in which case the ethylene oxide content is then adapted accordingly; in other words, at 10% by weight propylene oxide, the ethylene oxide fraction in the polyether unit is 90% by weight, and, if the propylene oxide content is 100% by weight, the fraction of ethylene oxide in the polyether unit accounts for 0% by weight.

Good properties for the hot-cure flexible polyurethane foam stabilizer solution in terms of pore distribution and quality of the hot-cure flexible polyurethane foam are obtained if the propylene oxide fraction, averaged over all of the polyether units of the polyethersiloxane, is 40% to 90% by weight, preferably $\geq 50\%$ by weight, more preferably $\geq 55\%$ by weight, and with particular preference $\geq 60\%$ by weight.

In addition, however, it is also possible to incorporate further alkylene oxides into the polyethers. They include, in particular, butylene oxide, dodecene oxide, and styrene oxide.

For use in connection with the production of hot-cure flexible polyurethane foams particular suitability in accordance with the invention is given to hot-cure flexible polyurethane foam stabilizer solutions wherein a hot-cure flexible polyurethane foam stabilizer solution comprises:
- $\geq 42\%$ to $\leq 68\%$, preferably $\geq 45\%$ to $\leq 65\%$, and more preferably $\geq 47\%$ to $\leq 62\%$ by weight of polyethersiloxane, a polyethersiloxane content of 50% to 60% by weight being particularly preferred,
- $\geq 1\%$ to $\leq 10\%$, preferably $\geq 2\%$ to $\leq 8\%$, and more preferably $\geq 4\%$ to $\leq 6\%$ by weight of organic surfactant,
- $\geq 15\%$ to $\leq 55\%$, preferably $\geq 20\%$ to $\leq 50\%$, and more preferably $\geq 30\%$ to $\leq 40\%$ by weight of water, and
- $\geq 0\%$ to $\leq 15\%$, preferably $\geq 1\%$ to $\leq 10\%$, and more preferably $\geq 2\%$ to $\leq 5\%$ by weight of organic solvent additions, preferably an organic solvent that acts as an antifreeze agent.

Where appropriate the hot-cure flexible polyurethane foam stabilizer solution may contain further additives as an additional component. The fraction of the above components of the hot-cure flexible polyurethane foam stabilizer solution is selected in each case such that the total fraction of the components does not exceed 100% by weight.

One inventively preferred hot-cure flexible polyurethane foam stabilizer solution comprises:
- $\geq 45\%$ to $\leq 55\%$ by weight, preferably 50% by weight of polyethersiloxane,
- $\geq 1\%$ to $\leq 10\%$ by weight, preferably $\geq 2\%$ by weight to $\leq 8\%$ by weight, and more preferably 5% by weight of alkylbenzenesulfonate,
- $\geq 30\%$ to $\leq 50\%$ by weight, preferably $\geq 35\%$ to $\leq 45\%$ by weight, and more preferably 40% by weight of water, and
- $\geq 1\%$ to $\leq 10\%$ by weight, preferably $\geq \geq 3\%$ to $\leq 7\%$ by weight, and more preferably 5% by weight of dipropylene glycol.

Where appropriate the hot-cure flexible polyurethane foam stabilizer solution may contain further additives as an additional component. The fraction of the above components of the hot-cure flexible polyurethane foam stabilizer solution is selected in each case such that the total fraction of the components does not exceed 100% by weight.

It is self-evident that the respective components are matched to one another in such a way as to minimize the viscosity. The inventively desired viscosity ranges have already been described above for the hot-cure flexible polyurethane foam stabilizer solution. The desired viscosity can be set by appropriately raising or lowering the organic surfactant fraction and/or by means of the ratio of water to polyethersiloxane. It is possible where appropriate to exert further influence over the viscosity of the hot-cure flexible polyurethane foam stabilizer solution by the corresponding addition of inorganic salts.

In order to ensure a good concentration distribution of the hot-cure flexible polyurethane foam stabilizer solution in the hot-cure flexible polyurethane foam reaction mixture, it is possible with preference to use homogeneous and transparent solutions of the hot-cure flexible polyurethane foam stabilizer solution. Transparent hot-cure flexible polyurethane foam stabilizer solutions of this kind may take the form, for example, of a clear or slightly cloudy solution. Suitable transparent hot-cure flexible polyurethane foam stabilizer solutions may for example also have an opaque shimmer.

Hot-cure flexible polyurethane foam stabilizer solutions containing flocs or a sediment are not—in accordance with the invention—suitable hot-cure flexible polyurethane foam stabilizer solutions if the viscosity is above 5000 mPa·s.

Flocs and/or the development of a sediment can be avoided by appropriately setting the proportions of water, surfactant, and polyethersiloxane, where increasing the surfactant concentration and at the same time lowering the polyethersiloxane concentration produces the inventively preferred, low-viscosity hot-cure flexible polyurethane foam stabilizer solutions.

The hot-cure flexible polyurethane foam stabilizer solutions of the invention are storage-stable at room temperature. It has emerged that hot-cure flexible polyurethane foam stabilizer solutions of the invention exhibit no phase separation and/or precipitation over a period of at least 14 days. The high storage stability and also the avoidance of precipitation, such as flocs, can be set via the proportion of the components: organic surfactant, polyethersiloxane, water, and, where appropriate, inorganic salts.

In accordance with the present invention preferred hot-cure flexible polyurethane foam stabilizer solutions contain no flocs and/or sediment.

In spite of their high water content, the hot-cure flexible polyurethane foam stabilizer solutions of the invention are also notable for an increased cloud point as compared with the blends of polyethersiloxanes in water without surfactant. Preferred hot-cure flexible polyurethane foam stabilizer solutions of the invention have a cloud point of $\geq 40°$ C., preferably $\geq 50°$ C., and more preferably $\geq 60°$ C.

Organic surfactants which can be used for the hot-cure flexible polyurethane foam stabilizer solution may be selected from the group encompassing anionic surfactants, cationic surfactants, nonionic surfactants and/or amphoteric surfactants, the organic surfactant preferably being an anionic surfactant. The hot-cure flexible polyurethane foam stabilizer solutions according to the invention comprise preferably one or more surfactants selected from anionic, nonionic, cationic, ampholytic (amphoteric, zwitterionic) surfactants and mixtures thereof.

A typical listing of anionic, cationic, nonionic, and ampholytic (zwitterionic) classes and types of these surfactants is given in U.S. Pat. No. 3,929,678 and in U.S. Pat. No. 4,259,217, which are hereby introduced as a reference and whose content is incorporated in its entirety. Generally speaking, ampholytic, amphoteric, and zwitterionic surfactants are used preferably in combination with one or more anionic and/or nonionic surfactants.

Anionic Surfactant

The compositions of the invention preferably comprise an anionic surfactant. Essentially any anionic surfactant that is suitable for cleaning may be present in the hot-cure flexible polyurethane foam stabilizer solution. Such surfactants may include salts, including, for example, sodium salts, potassium salts, ammonium salts and substituted ammonium salts, such as mono-, di-, and tri-ethanolamine salts of the anionic sulfate, sulfonate, carboxylate, and sarcosinate surfactants. Anionic sulfate and sulfonate surfactants are preferred.

Strongly preferred are surfactant systems which comprise a sulfonate surfactant or a sulfate surfactant, preferably a linear or branched alkylbenzenesulfonate and alkyl ethoxy sulfates, as described herein, optionally in combination with cationic surfactants, as described herein.

Other anionic surfactants comprise the isethionates, such as the acylisethionates, N-acyltaurates, fatty acid amides of methyltauride, alkylsuccinates and sulfosuccinates, monoesters of sulfosuccinate (especially saturated and unsaturated $C_{12}$-$C_{18}$ monoesters), diesters of sulfosuccinate (especially saturated and unsaturated $C_6$-$C_{14}$ diesters), and N-acylsarcosinates. Resin acids and hydrogenated resin acids, such as rosin, hydrogenated rosin, and resin acids and hydrogenated resin acids which are present in or derived from tallow oil, are likewise suitable.

Anionic Sulfate Surfactant

Anionic sulfate surfactants suitable for the utility in question comprise the linear and branched, primary and secondary alkyl sulfates, alkyl ethoxy sulfates, fatty oleyl glycerol sulfates, alkylphenol ethylene oxide ether sulfates, the $C_5$-$C_{17}$-acyl-N—($C_1$-$C_4$-alkyl)- and —N—($C_1$-$C_2$ hydroxyalkyl) glucamine sulfates, and sulfates of the alkylpolysaccharides, such as the sulfates of alkylpolyglucoside (the nonionic non-sulfated compounds being described herein).

Alkyl sulfate surfactants are preferably selected from the linear and branched, primary $C_{10}$-$C_{18}$ alkyl sulfates, more preferably the branched-chain $C_{11}$-$C_{15}$ alkyl sulfates and the straight-chain $C_{12}$-$C_{14}$ alkyl sulfates.

Alkyl ethoxy sulfate surfactants are preferably selected from the group consisting of the $C_{10}$-$C_{18}$ alkyl sulfates ethoxylated with 0.5 to 20 mol of ethylene oxide per molecule. More preferably the alkyl ethoxy sulfate surfactant is a $C_{11}$-$C_{18}$, most preferably a $C_{11}$-$C_{15}$ alkyl sulfate ethoxylated with 0.5 to 7, preferably 1 to 5, mol of ethylene oxide per molecule.

One particularly preferred aspect of the invention uses mixtures of the preferred alkyl sulfate and/or sulfonate and alkyl ethoxy sulfate surfactants. Mixtures of this kind have been disclosed in PCT patent application WO 93/18124, fully incorporated by reference.

Anionic Sulfonate Surfactant

Anionic sulfonate surfactants suitable for the utility in question encompass the salts of linear $C_5$-$C_{20}$ alkylbenzenesulfonates, alkyl ester sulfonates, primary or secondary $C_6$-$C_{22}$ alkanesulfonates, $C_6$-$C_{24}$ olefinsulfonates, arylsulfonates (especially unsubstituted and alkyl-substituted benzene- and naphthalene-sulfonates), sulfonated polycarboxylic acids, alkylglycerolsulfonates, fatty acylglycerolsulfonates, monoesters of sulfosuccinate (especially saturated and unsaturated $C_{12}$-$C_{18}$ monoesters), diesters of sulfosuccinate (especially saturated and unsaturated $C_6$-$C_{14}$ diesters), fatty oleylglycerolsulfonates, and any desired mixture thereof.

Anionic Carboxylate Surfactant

Suitable anionic carboxylate surfactants encompass the alkylethoxycarboxylate, the alkylpolyethoxypolycarboxylate surfactants and the soaps ("alkylcarboxyls"), especially certain secondary soaps as described herein.

Suitable alkylethoxycarboxylates comprise those with the formula RO($CH_2CH_2O$)$_x$$CH_2$COO-M$^\oplus$, in which R is a $C_6$- to $C_{18}$ alkyl group, x is in the range from 0 to 10, and the ethoxylate distribution is such that the amount of material where x is 0 is less than 20% by weight, and M is a cation. Suitable alkylpolyethoxypolycarboxylate surfactants comprise those with the formula RO($CHR^1$—$CHR^2$—O)—$R^3$, in which R is a $C_6$ to $C_{18}$ alkyl group, x is from 1 to 25, $R^1$ and $R^2$ are selected from the group consisting of hydrogen, methyl acid radical, succinic acid radical, hydroxysuccinic acid radical, and mixtures thereof, and $R^3$ is selected from the group consisting of hydrogen, substituted or unsubstituted hydrocarbon having between 1 and 8 carbon atoms, and mixtures thereof.

Suitable soap surfactants encompass the secondary soap surfactants which contain a carboxyl unit attached to a secondary carbon. Preferred secondary soap surfactants for the inventive use in hot-cure flexible polyurethane foam stabilizer solutions are water-soluble members selected from the group consisting of the water-soluble salts of 2-methyl-1-undecanoic acid, 2-ethyl-1-decanoic acid, 2-propyl-1-nonanoic acid, 2-butyl-1-octanoic acid, and 2-pentyl-1-heptanoic acid.

Sarcosinate Surfactants

Other suitable anionic surfactants are the sarcosinates of the formula R—CON($R^1$)$CH_2$COOM, in which R is a linear or branched C5-C17 alkyl group or alkenyl group, $R^1$ is a $C_1$-$C_4$ alkyl group, and M is an alkali metal ion. Preferred examples are the myristyl- and oleoylmethylsarcosinates in the form of their sodium salts.

The anionic surfactant may with particular preference be selected from the group encompassing alkyl sulfates, aryl sulfonates, fatty alcohol sulfates, secondary alkyl sulfates, paraffinsulfonates, alkyl ether sulfates, alkyl polyglycol ether sulfates, fatty alcohol ether sulfates, alkylbenzenesulfonates, alkylphenol ether sulfates, alkyl phosphates, phosphoric mono-, di-, tri-esters, alkyl ether phosphates, ethoxylated fatty alcohol phosphoric esters, phosphonic esters, sulfosuccinic diesters, sulfosuccinic monoesters, ethoxylated sulfosuccinic monoesters, sulfosuccinamides, α-olefinsulfonates, alkyl carboxylates, alkyl ether carboxylates, alkyl polyglycol carboxylates, fatty acid isethionate, fatty acid methyltauride, fatty acid sarcoside, arylsulfonates, naphthalenesulfonates, alkyl glyceryl ether sulfonates, polyacrylates and/or α-sulfo fatty acid esters.

Cationic Surfactants

Suitable cationic surfactants useful as a surfactant component for the hot-cure flexible polyurethane foam stabilizer solution encompass quaternary ammonium surfactants. The quaternary ammonium surfactant is preferably a mono-$C_6$-$C_{16}$, preferably —$C_6$-$C_{10}$, —N-alkyl- or -alkenylammonium surfactant, the remaining N positions being substituted by methyl, hydroxyethyl or hydroxypropyl groups. Preference is given likewise to the monoalkoxylated and bisalkoxylated amine surfactants.

Another suitable group of cationic surfactants which can be used in the hot-cure flexible polyurethane foam stabilizer solutions are cationic ester surfactants.

The cationic ester surfactant is a preferably water-dispersible compound having surfactant properties which comprises at least one ester (i.e., —COO—) bond and at least one cationically charged group.

Suitable cationic ester surfactants, including choline ester surfactants, are disclosed for example in U.S. Pat. Nos. 4,228,042, 4,239,660 and 4,260,529.

From a preferred standpoint the ester bond and the cationically charged group in the surfactant molecule are separated from one another by a spacer group consisting of a chain comprising at least three atoms (i.e., chain length of three atoms), preferably three to eight atoms, more preferably three to five atoms, most preferably three atoms. The atoms which form the spacer group chain are selected from the group consisting of carbon, nitrogen, and oxygen atoms and any mixtures thereof, with the proviso that every nitrogen or oxygen atom in the chain is connected only to carbon atoms in the chain. Consequently, spacer groups containing, for example, —O—O— (i.e., peroxide), —N—N—, —N—O— bonds are excluded, while spacer groups containing, for example, —CH$_2$—O—CH$_2$— and —CH$_2$—NH—CH$_2$— bonds are included. From a preferred standpoint the spacer group chain comprises only carbon atoms, and most preferably the chain is a hydrocarbyl chain.

Cationic Monoalkoxylated Amine Surfactants

Cationic monoalkoxylated amine surfactants which can be used with preference have the general formula V:

$$R^1R^2R^3N^{\oplus}Z_nR^4X^- \quad (V)$$

in which $R^1$ is an alkyl or alkenyl unit having 6 to 18 carbon atoms, preferably 6 to 16 carbon atoms, most preferably from 6 to 14 carbon atoms; $R^2$ and $R^3$ each independently are alkyl groups having from one to three carbon atoms, preferably methyl, and most preferably both $R^2$ and $R^3$ are methyl groups; $R^4$ is selected from hydrogen (preferred), methyl, and ethyl; $X^-$ is an anion, such as chloride, bromide, methyl sulfate, sulfate or the like, in order to provide electrical neutrality; Z is an alkoxy group, particularly an ethoxy, propoxy or butoxy group; and n is from 0 to 30, preferably 2 to 15, most preferably 2 to 8.

The $Z_nR^4$ group in formula V preferably has n=1 and is a hydroxylalkyl group having not more than 6 carbon atoms, the —OH group being separated by not more than 3 carbon atoms from the quaternary ammonium nitrogen atom. Particularly preferred $Z_nR^4$ groups are —CH$_2$CH$_2$OH, —CH$_2$CH$_2$CH$_2$OH, —CH$_2$CH(CH$_3$)OH, and CH(CH$_3$)CH$_2$OH, with —CH$_2$CH$_2$OH being particularly preferred. Preferred $R^1$ groups are linear alkyl groups. Linear $R^1$ groups having 8 to 14 carbon atoms are preferred.

Preferred cationic monoalkoxylated amine surfactants which additionally can be used with preference have the formula VI:

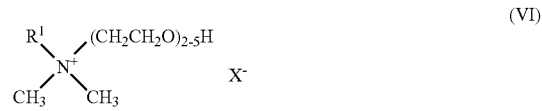

(VI)

in which $R^1$ is $C_{10}$-$C_{18}$ hydrocarbyl and mixtures thereof, particularly $C_{10}$-$C_{14}$ alkyl, preferably $C_{10}$ and $C_{12}$ alkyl, X is any suitable anion for providing charge compensation, preferably chloride or bromide. The ethoxy (CH$_2$CH$_2$O—) units (EO) of the formula II can also be replaced by butoxy, iso-propoxy [CH(CH$_3$)CH$_2$O]—, and [CH$_2$CH(CH$_3$)O] units (i-Pr) or n-propoxy units (Pr) or mixtures of EO and/or Pr and/or i-Pr units.

Cationic Bisalkoxylated Amine Surfactant

The cationic bisalkoxylated amine surfactant has preferably the general formula VII:

(VII)

in which $R^1$ is an alkyl or alkenyl unit having 8 to 18 carbon atoms, preferably 10 to 16 carbon atoms, most preferably 10 to 14 carbon atom; $R^2$ is an alkyl group having one to three carbon atoms, preferably methyl; $R^3$ and $R^4$ independently may vary and are selected from hydrogen (preferred), methyl, and ethyl, and $X^-$ is an anion, such as chloride, bromide, methyl sulfate, sulfate or the like, which is sufficient to provide electrical neutrality. Zs may vary independently of one another and are in each case $C_1$-$C_4$-alkoxy, particularly ethoxy (i.e., —CH$_2$CH$_2$O—), propoxy, butoxy, and mixtures thereof; n is identical or different at each occurrence and is 1 to 30, preferably 1 to 4, and most preferably 1.

Preferred cationic bisalkoxylated amine surfactants possess the formula VIII:

(VIII)

in which $R^1$ is $C_{10}$-$C_{18}$ hydrocarbyl and mixtures thereof, preferably $C_{10}$, $C_{12}$, $C_{14}$ alkyl and mixtures thereof. X is any suitable anion for providing charge compensation, preferably chloride. With reference to the above-indicated general structure of the cationic bisalkoxylated amine, in one preferred compound $R^1$ is derived from (coconut) C12-C14 alkyl fatty acids.

Further suitable cationic bisalkoxylated amine surfactants encompass compounds of the formula IX:

(IX)

in which $R^1$ is $C_{10}$-$C_{18}$ hydrocarbyl, preferably $C_{10}$-$C_{14}$ alkyl, independently p is 1 to 3 and q is 1 to 3, $R^2$ is $C_1$-$C_3$ alkyl, preferably methyl, and X is an anion, preferably chloride or bromide.

Other compounds of the above type encompass those in which the ethoxy ($CH_2CH_2O$—) units (EO) are replaced by butoxy (Bu), isopropoxy [$CH(CH_3)CH_2O$], and [$CH_2CH(CH_3O$] units (i-Pr) or n-propoxy units (Pr), or mixtures of EO and/or Pr and/or i-Pr units.

The cationic surfactant can with particular preference be selected from the group encompassing ester quats, preferably di(tallow fatty acid amidoethyl)methylpolyethoxy-ammonium methosulfate, diamidoamine quats, alkyloxyalkyl quats, preferably cocopentaethoxymethylammonium methosulfate, and/or trialkyl quats, preferably cetyltrimethylammonium chloride.

Nonionic Surfactant

Substantially all nonionic surfactants are suitable herein. The ethoxylated and propoxylated nonionic surfactants are preferred.

Preferred alkoxylated surfactants may be selected from the classes of the nonionic condensates of alkyl phenols, nonionic ethoxylated alcohols, nonionic ethoxylated/propoxylated fatty alcohols, nonionic ethoxylate/propoxylate condensates with propylene glycol, and the nonionic ethoxylate condensation products with propylene oxide/ethylenediamine addition products.

Nonionic Surfactant of Alkoxylated Alcohol

The condensation products of aliphatic alcohols with 1 to 25 mol of alkylene oxide, particularly ethylene oxide, propylene oxide, butylene oxide, dodecene oxide or styrene oxide, are likewise suitable for use in accordance with the invention. The alkyl chain of the aliphatic alcohol may alternatively be linear or branched, primary or secondary, and contains generally from 6 to 22 carbon atoms. Particularly preferred are the condensation products of alcohols which possess an alkyl group having 8 to 20 carbon atoms with 2 to 10 mol of ethylene oxide per mole of alcohol.

Nonionic Polyhydroxy Fatty Acid Amide Surfactant

Polyhydroxy fatty acid amides which are suitable are those with the structural formula $R^2CONR^1Z$, in which: $R^1$ is H, $C_1$-$C_4$ hydrocarbyl, 2-hydroxyethyl, 2-hydroxypropyl, ethoxy, propoxy or a mixture thereof, preferably $C_1$-$C_4$ alkyl, more preferably $C_1$ or $C_2$ alkyl, most preferably $C_1$ alkyl (i.e., methyl); and $R^2$ is a $C_5$-$C_{31}$ hydrocarbyl, preferably a straight-chain $C_5$-$C_{19}$ alkyl or alkenyl, more preferably a straight-chain $C_9$-$C_{17}$ alkyl or alkenyl, most preferably a straight-chain $C_{11}$-$C_{17}$ alkyl or alkenyl, or a mixture thereof; and Z is a polyhydroxy hydrocarbyl having a linear hydrocarbyl chain, in which at least 3 hydroxyl groups are attached directly to the chain, or an alkoxylated derivative (preferably ethoxylated or propoxylated) thereof. Z is preferably derived in a reductive amination from a reducing sugar; more preferably Z is a glycidyl.

Nonionic Fatty Acid Amide Surfactant

Suitable fatty acid amide surfactants encompass those with the formula $R^6CON(R^7)_2$, where $R^6$ is an alkyl group having 7 to 21, preferably 9 to 17, carbon atoms and each $R^7$ is selected from the group consisting of hydrogen, $C_1$-$C_4$ alkyl, $C_1$-$C_4$ hydroxyalkyl, and —$(C_2H_4O)_xH$, with x being situated in the range from 1 to 3.

Nonionic Alkylpolysaccharide Surfactant

Suitable alkylpolysaccharides for use in this context are disclosed in U.S. Pat. No. 4,565,647, having a hydrophobic group containing 6 to 30 carbon atoms and a hydrophilic polysaccharide group, such as a polyglycoside group, which contains 1.3 to 10 saccharide units.

Preferred alkylpolyglycosides have the formula $R^2O(C_nH_{2n}O)_t(glycosyl)_x$ in which $R^2$ is selected from the group consisting of alkyl, alkylphenyl, hydroxyalkyl, hydroxyalkylphenyl, and mixtures thereof in which the alkyl groups contain from 10 to 18 carbon atoms; n is 2 or 3; t is from 0 to 10; and x is from 1.3 to 8. The glycosyl ist preferably derived from glucose.

The nonionic surfactant can be selected with particular preference from the group encompassing alcohol ethoxylates, fatty alcohol polyglycol ethers, fatty acid ethoxylates, fatty acid polyglycol esters, glyceride monoalkoxylates, alkanolamides, fatty acid alkylolamides, ethoxylated alkanolamides, fatty acid alkylolamido-ethoxylates, imidazolines, ethylene oxide-propylene oxide block copolymers, alkylphenol ethoxylates, alkylglucosides, ethoxylated sorbitan esters and/or amine alkoxylates.

Amphoteric Surfactant

Amphoteric surfactants which can be suitably used encompass the amine oxide surfactant and the alkylamphocarboxylic acids.

Suitable amine oxides comprise those compounds with the formula $R^3(OR^4)_xNO(R^5)_2$, in which $R^3$ is selected from an alkyl, hydroxyalkyl, acylamidopropyl; and alkylphenyl group or mixtures thereof with 8 to 26 carbon atoms; $R^4$ is an alkylene or hydroxyalkylene group having 2 to 3 carbon atoms, or mixtures thereof; x is from 0 to 5, preferably from 0 to 3; and each $R^5$ is an alkyl or hydroxyalkyl group having 1 to 3 or a polyethylene oxide group having 1 to 3 ethylene oxide groups. Preferred are $C_{10}$-$C_{18}$ alkyldimethylamine oxide and $C_{10}$-$C_{18}$ acylamidoalkyldimethylamine oxide.

Further suitable amphoteric surfactants can be described largely as derivatives of secondary and tertiary amines, derivatives of heterocyclic secondary and tertiary amines, or derivatives of quaternary ammonium, quaternary phosphonium or tertiary sulfonium compounds. Betaine and sultaine surfactants are preferred amphoteric surfactants.

Suitable betaines are those compounds with the formula $R(R')_2N+R^2COO$—, in which R is a $C_6$-$C_{18}$ hydrocarbyl group, each $R^1$ is generally $C_1$-$C_3$ alkyl, and $R^2$ is a $C_1$-$C_5$ hydrocarbyl group. Preferred betaines are $C_{12}$-$C_{18}$ dimethylammoniohexanoate and the $C_{10}$-$C_{18}$ acylamido-propane-(or -ethane-)dimethyl-(or diethyl-)betaines. Complex betaine surfactants are likewise suitable in accordance with the invention.

The amphoteric surfactant may with particular preference be selected from the group encompassing amphoacetates, amphodiacetates, glycinates, amphopropionates, sultaines, amine oxides and/or betaines.

A further subject of the present invention relates to a hot-cure flexible polyurethane foam stabilizer blend comprising amine, polyol and/or water, the hot-cure flexible polyurethane foam stabilizer blend containing at least 40% by weight of hot-cure flexible polyurethane foam stabilizer solution of the invention, based on the total weight of the hot-cure flexible polyurethane foam stabilizer blend.

Both the hot-cure flexible polyurethane foam stabilizer solution of the invention and/or the hot-cure flexible polyurethane foam stabilizer blend of the invention can be used for producing hot-cure flexible polyurethane foam.

By way of example, the hot-cure flexible polyurethane foam stabilizer solution of the invention can be used directly, i.e., without further additions, in the production of hot-cure flexible polyurethane foams.

By polyurethane foam is meant, generally speaking, foamed polymeric materials which form when polyfunctional isocyanates react with polyols. The linking structural element formed is in this case the urethane moiety. Water can be used as a blowing agent. In that case carbon dioxide and the corresponding amine are formed, the amine reacting with further isocyanate to give a urea group. The polyurethane foam may be constructed on a majority basis from urea groups, as well as urethane groups.

The hot-cure flexible polyurethane foam material of the invention is preferably a flexible foam based on polyether polyols. The hot-cure flexible polyurethane foam material of the invention may further take the form of slabstock foam or molded foam.

Under compressive stress the deformation resistance of hot-cure flexible polyurethane foam material is relatively low (DIN 7726).

Typical figures for the compressive stress at 40% compression of a hot-cure flexible polyurethane foam material are between 1 kPa and 10 kPa (procedure in accordance with DIN EN ISO3386-1/2).

The cell structure of the hot-cure flexible polyurethane foam material is predominantly open-celled.

The density of the hot-cure flexible polyurethane foam of the invention is situated preferably in a range from 5 to 80 $kg/m^2$, in particular in a range from 7 to 50 $kg/m^2$, with very particular preference in a range from 10 to 30 $kg/m^2$ (measured in accordance with DIN EN ISO 845, DIN EN ISO 823).

The hot-cure flexible polyurethane foams can be obtained from the reaction of polyols with isocyanates using a hot-cure flexible polyurethane foam stabilizer solution of the invention and/or further components.

By means of the hot-cure flexible polyurethane foam stabilizer solution of the invention it is possible to produce hot-cure flexible polyurethane foams having for example a pore size distribution in the range from 5 to 25 cells/cm.

As a chemical blowing agent for producing the hot-cure flexible polyurethane foam materials it is possible with preference to use water, which on its reaction with the isocyanate groups releases carbon dioxide. Water is used preferably in an amount of 0.2 to 6 parts by weight (all parts by weight based on 100 parts by weight of polyol), with particular preference in an amount of 1.5 to 5.0 parts by weight. Together with or instead of water it is also possible to employ blowing agents that act physically, examples being carbon dioxide, acetone, hydrocarbons, such as n-pentane, isopentane or cyclopentane, cyclohexane or halogenated hydrocarbons, such as methylene chloride, tetrafluoroethane, pentafluoropropane, heptafluoropropane, pentafluorobutane, hexafluorobutane or dichloromonofluoroethane. The amount of the physical blowing agent is in that case preferably in the range between 1 to 15 parts by weight, in particular 1 to 10 parts by weight, the amount of water preferably being in the range between 0.5 to 10 parts by weight, in particular 1 to 5 parts by weight. Carbon dioxide is preferred among the physical blowing agents, and is used preferably in combination with water as the chemical blowing agent.

Suitable isocyanates include the aliphatic, cycloaliphatic, araliphatic and, preferably aromatic polyfunctional isocyanates that are known per se. With particular preference isocyanates are used in a range from 80 to 120 mol % relative to the sum of the isocyanate-consuming components.

Specific examples that may be mentioned include the following: alkylene diisocyanates having 4 to 12 carbon atoms in the alkylene radical, such as 1,12-dodecane diisocyanate, 2-ethyltetramethylene 1,4-diisocyanate, 2-methylpentamethylene 1,5-diisocyanate, tetramethylene 1,4-diisocyanate, and, preferably, hexamethylene 1,6-diisocyanate, cycloaliphatic diisocyanates, such as cyclohexane 1,3- and -1,4-diisocyanate, and also any desired mixtures of these isomers, 1-isocyanato-3,3,5-trimethyl-5-isocyanatomethylcyclohexane (IPDI), 2,4- and 2,6-hexahydrotolylene diisocyanate and the corresponding isomer mixtures, 4,4'-, 2,2'-, and 2,4'-dicyclohexylmethane diisocyanate and the corresponding isomer mixtures, and, preferably, aromatic di- and polyisocyanates, such as, for example, 2,4- and 2,6-tolylene diisocyanate and the corresponding isomer mixtures, 4,4'-, 2,4'-, and 2,2'-diphenylmethane diisocyanate and the corresponding isomer mixtures, mixtures of 4,4'- and 2,2'-diphenylmethane diisocyanates, polyphenylpolymethylene polyisocyanates, mixtures of 4,4'-, 2,4'-, and 2,2'-diphenylmethane diisocyanates and polyphenylpolymethylene polyisocyanates (crude MDI), and mixtures of crude MDI and tolylene diisocyanates. The organic di- and polyisocyanates can be used individually or in the form of their mixtures. Particular preference is given to mixtures of polyphenylpolymethylene polyisocyanate with diphenylmethane diisocyanate, the fraction of 2,4'-diphenylmethane diisocyanate being preferably >30% by weight.

Use is also made advantageously of what are called modified polyfunctional isocyanates, i.e., products obtained by chemical reaction of organic di- and/or polyisocyanates. By way of example mention may be made of di- and/or polyisocyanates containing ester, urea, biuret, allophanate, carbodiimide, isocyanurate, uretdione and/or urethane groups. Specific examples that are suitable include the following: modified 4,4'-diphenylmethane diisocyanate, modified 4,4'- and 2,4'-diphenylmethane diisocyanate mixtures, modified crude MDI or 2,4- and/or 2,6-tolylene diisocyanate, organic, preferably aromatic polyisocyanates containing urethane groups, having NCO contents of 43% to 15% by weight, preferably from 31% to 21% by weight, based on the total weight, examples being reaction products with low molecular mass diols, triols, dialkylene glycols, trialkylene glycols or polyoxyalkylene glycols having molecular weights up to 6000, in particular with molecular weights up to 1500, which can be used as di- and/or polyoxyalkylene glycols individually or as mixtures. Examples that may be mentioned include the following: diethylene glycol, dipropylene glycol, polyoxyethylene, polyoxypropylene, and polyoxypropylene-polyoxyethene glycols, triols and/or tetraols. Also suitable are NCO-containing prepolymers having NCO contents of 25% to 3.5% by weight, preferably of 21% to 14% by weight, based on the total weight, prepared from the polyester polyols and/or preferably polyether polyols described below and 4,4'-diphenylmethane diisocyanate, mixtures of 2,4'- and 4,4'-diphenylmethane diisocyanate, 2,4- and/or 2,6-tolylene diisocyanates or crude MDI. Others which have proven appropriate are liquid polyisocyanates containing carbodiimide groups and/or isocyanurate rings, having NCO contents of 43% to 15%, preferably 31% to 21% by weight, based on the total weight, based for example on 4,4'-, 2,4'-, and/or 2,2'-diphenylmethane diisocyanate and/or 2,4- and/or 2,6-tolylene diisocyanate.

The modified polyisocyanates may be mixed with one another or with nonmodified organic polyisocyanates, such as, for example, 2,4'-, 4,4'-diphenylmethane diisocyanate, crude MDI, 2,4- and/or 2,6-tolylene diisocyanate.

The following have proven particularly appropriate as organic polyisocyanates and are therefore employed with preference: toluoylene diisocyanate, mixtures of diphenylmethane diisocyanate isomers, mixtures of diphenylmethane diisocyanate and polyphenylpolymethyl polyisocyanate or toluene diisocyanate with diphenylmethane diisocyanate and/or polyphenylpolymethyl polyisocyanate, or so-called prepolymers. Particular preference is given to using tolylene diisocyanate in the process of the invention.

In one particularly preferred embodiment the organic and/or modified organic polyisocyanates used are mixtures of 2,4-tolylene diisocyanate with 2,6-tolylene diisocyanate, having a 2,4-tolylene diisocyanate fraction of 80% by weight.

Suitable polyols are those having at least two H atoms that are reactive toward isocyanate groups; preference is given to using polyether polyols. Such polyether polyols can be prepared by known processes, as for example by anionic polymerization of alkylene oxides in the presence of alkali metal hydroxides or alkali metal alkoxides as catalysts, and with addition of at least one starter molecule containing 2 to 3 attached reactive hydrogen atoms, or by cationic polymerization of alkylene oxides in the presence of Lewis acids such as, for example, antimony pentachloride or boron fluoride etherate, or by double metal cyanide catalysis. Suitable alkylene oxides contain 2 to 4 carbon atoms in the alkylene radical. Examples of tetrahydrofuran, 1,3-propylene oxide, 1,2- and 2,3-butylene oxide; preference is given to using ethylene oxide and/or 1,2-propylene oxide. The alkylene oxides can be used individually, in alternation in succession, or as mixtures. Suitable starter molecules include water and 2- and 3-hydric alcohols, such as ethylene glycol, propane-1,2- and -1,3-diol, diethylene glycol, dipropylene glycol, glycerol, trimethylolpropane, etc. Polyfunctional polyols as well, such as sugars, can be used as starters.

The polyether polyols, preferably polyoxypropylene-polyoxyethylene polyols, possess a functionality of 2 to 5 and number-averaged molecular weights in the range from 500 to 8000, preferably 800 to 3500.

Where appropriate, flame retardants as well are added to the starting materials, preferably those which are liquid and/or are soluble in one or more of the components used for production of the foam. Commercially customary phosphorus flame retardants are employed with preference, examples being tricresyl phosphate, tris(2-chloroethyl) phosphate, tris(2-chloropropyl) phosphate, tris(2,3-dibromopropyl) phosphate, tris(1,3-dichloropropyl) phosphate, tetrakis(2-chloroethyl)ethylenediphosphate, trisbutoxyethyl phosphate, dimethyl methanephosphonate, diethyl ethanephosphonate, and diethyl diethanolaminomethylphosphonate. Likewise suitable are halogen- and/or phosphorus-containing flame-retardant polyols and/or melamine. In addition it is also possible to use melamine. The flame retardancy is preferably in an amount of not more than 35% by weight, preferably not more than 20% by weight, based on the polyol component. Further examples of surface-active additives which can be used as well where appropriate are foam stabilizers and also cell regulators, reaction retardants, stabilizers, flame retardants, dyes, and also substances having fungistatic and bacteriostatic activity. Details on usage and mode of action of these adjuvants are described in G. Oertel (ed.): "Kunststoff-Handbuch", volume VII, Carl Hanser Verlag, 3rd edition, Munich 1993, pp. 110-123.

In addition, in the process of the invention, preferably 0.05 to 0.5 part by weight, in particular 0.1 to 0.2 part by weight, of catalysts for the blowing reaction can be used. These catalysts for the blowing reaction are selected from the group of tertiary amines [triethylenediamine, triethylamine, tetramethylbutanediamine, dimethylcyclohexylamine, bis(2-dimethylaminoethyl)ether, dimethylaminoethoxyethanol, bis(3-dimethylaminopropyl)amine, N,N,N'-trimethylaminoethylethanolamine, 1,2-dimethylimidazole, N-(3-aminopropyl)imidazole, 1-methylimidazole, N,N,N',N'-tetramethyl-4,4'-diaminodicyclohexylmethane, N,N-dimethylethanolamine, N,N-diethylethanolamine, 1,8-diazabicyclo-5,4,0-undecene, N,N,N',N'-tetramethyl-1,3-propanediamine, N,N-dimethylcyclohexylamine, N,N,N',N'',N'''-pentamethyldiethylenetriamine, N,N,N',N'',N'''-pentamethyldipropylenetriamine, N,N'-dimethylpiperazine, N-methylmorpholine, N-ethylmorpholine, 2,2'-dimorpholinodiethyl ether, N,N-dimethylbenzylamine, N,N',N''-tris(dimethylaminopropyl)hexahydrotriazine, N,N,N',N'-tetramethyl-1,6-hexanediamine, tris(3-dimethylaminopropyl)amine, and/or tetramethylpropanamine]. Likewise suitable are acid-blocked derivatives of the tertiary amines. In one particular embodiment the amine used is dimethylethanolamine or bis(2-dimethylaminoethyl)ether. In another embodiment the amine used is triethylenediamine.

In the process of the invention it is also possible to use preferably 0.05 to 0.5 part by weight, in particular 0.1 to 0.3 part by weight, of catalysts for the gel reaction. The catalysts for the gel reaction are selected from the group of organometallic compounds and the metal salts of the following metals: tin, zinc, tungsten, iron, bismuth, and titanium. One particular embodiment uses catalysts from the group of the tin carboxylates. Very particular preference is given in that context to tin (2-ethylhexanoate) and tin ricinoleate. Tin 2-ethylhexanoate in particular is important for the inventive production of a hot-cure flexible polyurethane foam. Furthermore, preference is also given to tin compounds having fully or partly covalently attached organic radicals. Particular preference in this context is given to using dibutyltin dilaurate.

A comprehensive overview is found in G. Oertel (ed.): "Kunststoff-Handbuch", volume VII, Carl Hanser Verlag, 3rd edition, Munich 1993, pp. 139-192, and in D. Randall and S. Lee (eds.): "The Polyurethanes Book" J. Wiley, 1st edition, 2002.

In a further application the low-viscosity, aqueous hot-cure flexible polyurethane foam stabilizer solution of the invention can be used for low-pressure machines. In that case the low-viscosity, aqueous hot-cure flexible polyurethane foam stabilizer solution can be introduced separately into the mixing chamber. In a further version of the process, the low-viscosity, aqueous hot-cure flexible polyurethane foam stabilizer solution of the invention can also be admixed upstream of the mixing chamber into one of the components which subsequently enters the mixing chamber. This admixing can also take place in the raw materials tank.

In a further application the low-viscosity, aqueous hot-cure flexible polyurethane foam stabilizer solution of the invention can also be used on high-pressure machines. In that case the low-viscosity, aqueous hot-cure flexible polyurethane foam stabilizer solution can be added directly into the mixing head.

In a further version of the process, the low-viscosity, aqueous hot-cure flexible polyurethane foam stabilizer solution of the invention can also be admixed upstream of the mixing chamber into one of the components which subsequently enters the mixing chamber. This admixing can also take place in the raw materials tank.

The plant for the production of the hot-cure flexible polyurethane foam can be operated continuously or batchwise. The use of the low-viscosity, aqueous hot-cure flexible polyurethane foam stabilizer solution of the invention for continuous foaming is particularly advantageous. The foaming operation in that case may take place in either a horizontal or a vertical direction. In a further embodiment, the low-viscosity, aqueous hot-cure flexible polyurethane foam stabilizer solution of the invention can be utilized for the $CO_2$-technology.

In a further embodiment, foaming may also take place in molds.

The gas permeability of the hot-cure flexible polyurethane foam of the invention is situated preferably in a range from 1 to 300 mm ethanol column, in particular in a range from 7 to 25 mm ethanol column (measured by measuring the pressure difference on flow through a foam sample. For that purpose a foam disk 5 cm thick is placed on a smooth surface. A plate (10 cm×10 cm) weighing 800 g and having a central hole (diameter 2 cm) and a hose connection is placed on the foam sample. A constant air stream of 8 l/min is passed into the foam sample via the central hole. The pressure difference occurring (relative to unhindered outflow) is determined by means of an ethanol column in a graduated pressure meter. The more closed the foam, the greater the pressure which is built up and the greater the extent to which the surface of the ethanol column is pushed downward, and the greater the values measured).

The present invention additionally provides a product comprising a hot-cure flexible polyurethane foam produced using an inventive hot-cure flexible polyurethane foam stabilizer solution and/or a hot-cure flexible polyurethane foam stabilizer blend.

Figure 1:
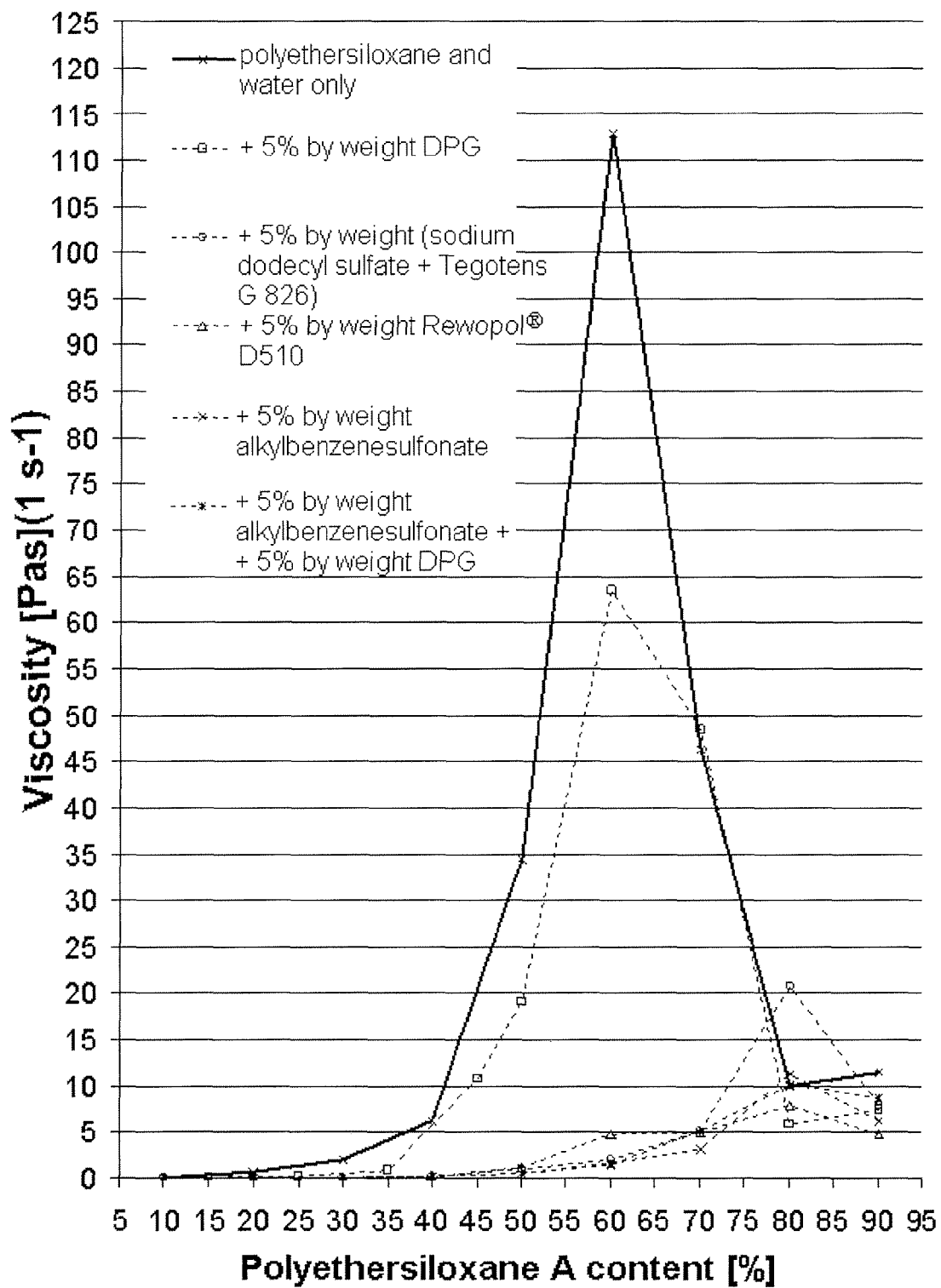
FIG. 1 depicts the relationship between viscosity and polyethersiloxane A content.

The invention is further described by the following non-limiting examples which further illustrate the invention, and are not intended, nor should they be interpreted to, limit the scope of the invention.

EXAMPLES

The subject matter of the present invention is elucidated in more detail with reference to the examples and tables below. For these examples a typical polyethersiloxane for stabilizing hot-cure flexible polyurethane foams was produced and was characterized in terms of its various blends.

Polyethersiloxane A

Polyethersiloxane A is an inventive polyethersiloxane of the following formula:

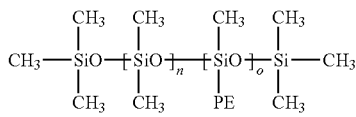

in which, o=4, n=70, PE=polyether=mixture of two polyethers: 37.5 eq % of a methylated polyether with Mn=3800 g/mol, prepared from 58% by weight propylene oxide and 42% by weight ethylene oxide, and 62.5 eq % of a methylated polyether with Mn=600 g/mol, prepared from 100% by weight ethylene oxide.

Preparation of Polyethersiloxane A:

The polyethersiloxane is prepared from the corresponding pendantly Si—H-functional polydimethylsiloxane and from the corresponding allyl polyether(s). The siloxane is prepared in accordance with the known processes, described for example in EP 0499200, by equilibration. The allyl polyether is obtained by alkoxylating alkylene oxides such as ethylene oxide, propylene oxide, dodecene oxide or styrene oxide with allyl alcohol as starter in an anionic polymerization. Examples of the synthesis options for allyl polyethers of this kind are disclosed in EP 0822218. For the hydrosilylation, a 30% by weight excess of the allyl polyether(s) over the stoichiometrically required amount is added. A typical platinum catalyst for the hydrosilylation reaction, such as cis-Pt or hexachloroplatnic acid, is introduced in an amount of 10 ppm. The reaction mixture is heated at 90° C. for 6 h for the reaction, the residual SiH function content being determined at intervals by volumetric reaction with potassium butoxide solution and determination of the hydrogen formed. The reaction is at an end when >98% of the Si—H functions employed have undergone reaction. The excess polyether present in the reaction product remains in the reaction mixture. The product thus obtained is used directly as polyethersiloxane A for the further tests. The preparation of Si—C-linked polyethersiloxanes of this kind has already been described frequently in the literature, as for example in U.S. Pat. No. 4,147,847, EP 0493836 (U.S. Pat. No. 5,145,879), and U.S. Pat. No. 4,855,379, fully incorporated by reference.

Blending of polyethersiloxane A

For the purpose of illustrating the invention, the abovementioned polyethersiloxane, by way of example, was blended with various organic solvents, with water, and with water containing surfactants. The viscosity of each of the samples was measured.

Blending of Polyethersiloxane A with Water:

In a mixing series the polyethersiloxane A was mixed in 10% by weight steps with water and the viscosities were ascertained.

TABLE I

| Mixture of polyethersiloxane A and water | | |
|---|---|---|
| Amount of polyethersiloxane A [% by weight] | Amount of water [% by weight] | Viscosity (at 1 s$^{-1}$) [Pa · s] |
| 90 | 10 | 11.5 |
| 80 | 20 | 10.0 |
| 70 | 30 | 46.4 |
| 60 | 40 | 113 |
| 50 | 50 | 34.5 |
| 40 | 60 | 6.1 |
| 30 | 70 | 2.0 |
| 20 | 80 | 0.6 |
| 10 | 90 | 0.08 |

It is apparent that the course of the viscosity between the pure water and the pure polyethersiloxane is in no way linear. Instead, beginning at 30% by weight of polyethersiloxane in the mixture with water, there is a very significant increase in the viscosity. The maximum is reached at about 60% by weight polyethersiloxane in the mixture with water. There it is possible for values up to more than 100 Pa·s to occur. Such high viscosities result in a gellike behavior. If the fraction of polyethersiloxane is increased further, the viscosity then drops again. At about 80% by weight, the region of drastic increase in viscosity is at an end. The viscosity then falls in the direction of the pure polyethersiloxane. A graph of the viscosity figures is attached in FIG. 1. It is obvious that the preparation of ready-to-use, low-viscosity hot-cure flexible polyurethane foam stabilizer solutions—viscosity ≦5000 mPa·s—with water as solvent is not possible without further additions in the range from 40% to 80% by weight polyethersiloxane in the mixture.

Addition of various adjuvants to the mixtures prepared from polyethersiloxane and water:

Various adjuvants were then added to the pre-prepared blends of polyethersiloxane and water. The amounts by weight of the adjuvants, in % by weight, based on the polyethersiloxane/water mixture (100% by weight), were weighed out and added to the mixture. The absolute amounts of polyethersiloxane and water in the mixture including surfactant are lowered as a result by the corresponding factor, but the ratio between polyethersiloxane and water is retained (which is very important for the phase behavior). First of all an attempt was made to achieve a desired low-viscosity solution of the two polyethersiloxanes in water by addition of a typical organic solvent for polyethersiloxanes. The solvent used was dipropylene glycol (DPG). DPG is the standard solvent for hot-cure flexible polyurethane foam stabilizers. In this case an amount of 5% by weight DPG was added to the blends of the polyethersiloxanes and water.

TABLE II

Mixture of polyethersiloxane A and water and addition of 5% by weight DPG

| Amount of polyethersiloxane A [% by weight] | Amount of water [% by weight] | Viscosity (at 1 s$^{-1}$) [Pa · s] |
|---|---|---|
| 90 | 10 | 7.4 |
| 80 | 20 | 5.9 |
| 70 | 30 | 48.5 |
| 60 | 40 | 63.5 |
| 50 | 50 | 19.1 |
| 45 | 55 | 10.7 |
| 30 | 70 | 0.8 |
| 20 | 80 | 0.1 |
| 10 | 90 | 0.02 |

It is apparent that the addition of 5% by weight DPG does lower the viscosity somewhat, but there is still a drastic increase in viscosity observed. The addition of higher quantities of DPG does nothing to alter this situation, as can be inferred from the comparative examples in Table III. As well as the DPG, a liquid polyether (IPE) was used here as solvent. This IPE is a liquid polyether prepared starting from n-butanol, with randomly distributed incorporation of ethylene oxide and propylene oxide, having an average molar mass of approximately 1000 g/mol. 42% by weight is propylene oxide and 58% by weight ethylene oxide. This polyether is prepared in analogy to the allyl-functional polyethers described above, by alkoxylation.

TABLE III

Mixture of polyethersiloxane A and various solvents at higher concentration

| Amount of polyethersiloxane A [% by weight] | Amount of water [% by weight] | Adjuvant type | Adjuvant amount [% by weight] | Viscosity (at 1 s$^{-1}$) [Pa · s] |
|---|---|---|---|---|
| 60 | 40 | — | — | 113 |
| 60 | 40 | DPG | 20 | 11.1 |
| 60 | 40 | liquid polyether (IPE) | 20 | 10.5 |

Although the increase in viscosity is more moderate, it is still the case that a viscosity above 5 Pa·s is observed, which rules out such blends for industrial use as polyurethane stabilizers.

In contrast to the solvents mentioned above, surfactants or surfactant mixtures were added to the following blends of the polyethersiloxane A with water. As far as the surfactants are concerned, blends with water are in some cases customary in the art. In such cases, the aim when preparing the sample was to add 5% by weight of pure surfactant; in other words, in the case of dilute surfactants, a correspondingly greater amount of a surfactant blend was employed. The water present in some cases in the surfactant blend was taken into account with regard to the total water content of the polyethersiloxane/water/surfactant mixture.

First of all a 2-ethylhexylsulfonate-Na salt was used with the trade name Rewopol® D 510, available from Degussa. Rewopol® D 510 itself is a 40% by weight blend with 60% by weight water.

TABLE IV

Mixture of polyethersiloxane A and water and addition of 5% by weight 2-ethylhexylsulfonate-Na

| Amount of polyethersiloxane A [% by weight] | Amount of water [% by weight] | Viscosity (at 1 s$^{-1}$) [Pa · s] |
|---|---|---|
| 90 | 10 | 4.8 |
| 80 | 20 | 7.9 |
| 70 | 30 | 4.9 |
| 60 | 40 | 4.8 |
| 50 | 50 | 1.1 |
| 40 | 60 | 0.14 |
| 30 | 70 | 0.04 |
| 20 | 80 | 0.04 |
| 10 | 90 | 0.004 |

It is apparent that through addition of 5% by weight of the surfactant 2-ethylhexylsulfonate-Na in the case of the polyethersiloxane A in the range according to the invention it is entirely possible to obtain an acceptable, low viscosity.

A further possibility, besides the use of pure surfactants, is regarded as being a mixture of suitable surfactants. A mixture of 50% by weight Tegotens® 826—an oligoalkylglycoside available from Degussa—and 50% by weight sodium dodecyl sulfate is of particular interest in this context.

TABLE V

Mixture of polyethersiloxane A and water and addition of 5% by weight surfactant mixture (surfactant mixture = 50% by weight Tegotens ® G 826, 50% by weight sodium dodecyl sulfate)

| Amount of polyethersiloxane A [% by weight] | Amount of water [% by weight] | Viscosity (at 1 s$^{-1}$) [Pa · s] |
|---|---|---|
| 90 | 10 | 7.9 |
| 80 | 20 | 20.8 |
| 70 | 30 | 5.0 |
| 60 | 40 | 1.9 |
| 50 | 50 | 1.0 |
| 40 | 60 | 0.12 |
| 30 | 70 | 0.03 |
| 20 | 80 | 0.01 |
| 10 | 90 | 0.001 |

With the polyethersiloxane A it is possible to obtain viscosities ≦5 Pa·s for all of the blends according to the invention.

Used below is a linear alkylbenzenesulfonate sodium salt having an alkyl chain length of $C_{10}$ to $C_{13}$, with the trade name Reworyl® NKS 50, available from Degussa. It is a 50% by weight blend in water.

TABLE VI

Mixture of polyethersiloxane A and water and addition of 5% by weight alkylbenzenesulfonate, Na

| Amount of polyethersiloxane A [% by weight] | Amount of water [% by weight] | Viscosity (at 1 s$^{-1}$) [Pa · s] |
|---|---|---|
| 90 | 10 | 6.3 |
| 80 | 20 | 11.3 |
| 70 | 30 | 3.1 |
| 60 | 40 | 1.6 |
| 50 | 50 | 0.49 |
| 40 | 60 | 0.17 |
| 30 | 70 | 0.053 |
| 20 | 80 | 0.016 |
| 10 | 90 | 0.006 |

It is apparent that in the range according to the invention the alkylbenzenesulfonate lowers the viscosity below 5 Pa·s.

Besides the use of surfactants, the combined use of surfactants and organic solvents may be sensible. This may be necessary particularly with a view to improving the freeze protection. Below, for this purpose, in addition, 5% by weight DPG was added to the samples from Table VI.

TABLE VII

Mixture of polyethersiloxane A and water and addition of 5% by weight alkylbenzenesulfonate, Na and 5% by weight DPG.

| Amount of polyethersiloxane A [% by weight] | Amount of water [% by weight] | Viscosity (at 1 s$^{-1}$) [Pa · s] |
|---|---|---|
| 90 | 10 | 8.7 |
| 80 | 20 | 10.1 |
| 70 | 30 | 5.0 |
| 60 | 40 | 1.5 |
| 50 | 50 | 0.42 |
| 40 | 60 | 0.15 |
| 30 | 70 | 0.048 |
| 20 | 80 | 0.016 |
| 10 | 90 | 0.006 |

Comparing Table VI and Table VII, no marked change can be observed in the viscosity profile. The addition of DPG initially does not alter much about the viscosity-lowering properties of the addition of an organic surfactant to a mixture of polyethersiloxane and water, but may yet have further advantages such as, for example, greater antifreeze security. The polyethersiloxane was used, furthermore, in a blend with DPG (noninventive) and with water and organic surfactant (inventive example) when producing a hot-cure flexible polyurethane foam in the laboratory. The blends used in this case were as follows:
60% by weight polyethersiloxane
40% by weight DPG
or
60% by weight polyethersiloxane
35% by weight water
5% by weight alkylbenzenesulfonate, Na The blends prepared in this way were then investigated in a typical hot-cure flexible polyurethane foam formulation:
General formula for the production of experimental hot-cure flexible polyurethane foams:
  100 parts by weight polyol (Desmophen® PU20WB01 from Bayer, OH number 56)
  5.0 parts by weight water (chemical blowing agent) (in the case of the water-containing polyethersiloxane blend, lower correspondingly)
  1.0 part by weight polyethersiloxane blend
  0.15 part by weight amine catalyst (triethylenediamine)
  0.23 part by weight tin catalyst (tin 2-ethylhexanoate)
  5.0 parts by weight methylene chloride (additional physical blowing agent)
  63.04 parts by weight isocyanate (tolylene diisocyanate, TDI-80) (ratio of isocyanate groups to isocyanate-consuming reactive groups=1.15)

Procedure:
Polyol, water, catalysts, and stabilizer were placed in a cardboard cup and mixed up using a stirring disk (45 s at 1000 rpm). Then the methylene chloride was added and mixing carried out again at 1000 rpm for 10 s. After that the isocyanate (TDI-80) was added and stirring was carried out again, at 2500 rpm, for 7 s. The mixture was then introduced into a box measuring 30 cm×30 cm×30 cm. During foaming, the rise height was measured by means of an ultrasound height measuring system. The rise time is the time which elapses until the foam has reached its maximum rise height. Settling refers to the subsidence of the foam surface after the hot-cure flexible polyurethane foam has blown. The settling is measured 3 minutes after blowing, in relation to the maximum rise height. The density was measured in accordance with DIN EN ISO 845 and DIN EN ISO 823. The cell count was taken using a magnifier with graduation, at three points, and the values were averaged.

TABLE VIII

Results of hot-cure flexible polyurethane foam test foaming

| Polyethersiloxane | Blend with | Rise time [s] | Settling [cm] | Density [kg/m$^3$] | Cell count [1/cm] |
|---|---|---|---|---|---|
| A | DPG | 86 | −0.1 | 18.0 | 7 |
| A | Water + alkylbenzene-sulfonate, Na | 87 | −0.1 | 18.1 | 6 |

In the course of the test foamings it emerges that both blends of the polyethersiloxane show identical properties. With the test foamings, therefore, no effect of the solvent can be observed. In other hot-cure flexible polyurethane foam formulations, nevertheless, it is not possible to rule out differences in the foaming behavior of a blend of polyethersiloxanes with organic solvents and water. Specifically, the absence of dipropylene glycol may also lead to more open foam structures. In the context of the relevant objective, a blend of polyethersiloxanes with a water/surfactant mixture can be classed as being useful as a hot-cure flexible polyurethane foam stabilizer.

A final objective of interest concerns the type of surfactants which are able to result in the reduction in viscosity set out in this invention. To ascertain this, the polyethersiloxane was mixed with a wide variety of surfactants. The amount used of the pure surfactant in each case is 5% by weight in the mixture as a whole. Based on a mixture of polyethersiloxane and water without surfactant, the ratio set out in Table IX is found. The resulting viscosities are set out in Tables IX and X.

TABLE IX

Mixture of the two polyethersiloxanes and water in the ratio of the subsequent surfactant serial experiments

| Polyethersiloxane | Amount of polyethersiloxane [% by weight] | Amount of water [% by weight] | Viscosity (at 1 s$^{-1}$) [Pa · s] |
|---|---|---|---|
| A | 52.6 | 47.4 | 45.6 |

TABLE X

Mixture of 50% by weight polyethersiloxane A, 45% by weight water, and 5% by weight various surfactants

| Surfactant | Brand name | Viscosity [Pa · s] |
|---|---|---|
| Anionic surfactants | | |
| Alkyl sulfates/ fatty alcohol sulfates | Rewopol ® NLS 28 (dodecyl sulfate, Na) | 3.4 |
| Secondary alkyl sulfates/ paraffinsulfonates | Hostapur ® SAS30 (C14/17 alkyl sulfate, Na) | 0.6 |
| Alkylbenzenesulfonates | Reworyl ® NKS 50 (C10/C13 alkylbenzenesulfonate, Na) | 0.9 |
| Alkyl phosphates/ phosphoric acid mono/di/tri ester | Berol ® 522 (decyl phosphate, K) | 3.4 |
| Phosphonic ester | Hostaphat ® OPS (octylphosphonic acid) | 0.4 |
| Sulfosuccinic diester | Rewopol ® SB DO 75 (diethylhexylsulfosuccinate, Na) | 1.4 |
| Sulfosuccinic monoester, ethoxylated | Rewopol ® SB FA 30 (lauryl ethoxysulfosuccinate, Na) | 1.5 |
| α-Olefinsulfonates | Hostapur ® OS (C14/16 α-olefinsulfonate, Na) | 1.5 |
| Fatty acid isethionate | Hostapon ® SCI 85C | 3.3 |
| Fatty acid methyltauride | Hostapon ® CT | 3.9 |
| Arylsulfonates | p-Toluenesulfonic acid, Na | 0.5 |
| Cationic surfactants | | |
| Alkyloxyalkyl quats | Rewoquat ® CPEM (Coco pentaethoxy methylammonium methosulfate) | 0.9 |
| Trialkyl quats | Adogen ® 444-29 Cetyl trimethylammonium chloride | 1.1 |
| Nonionic surfactants | | |
| Alcohol ethoxylates/ fatty alcohol polyglykol ethers | Rewopal ® LA10-80 (lauryl alcohol ethoxylate, n = 10) | 2.5 |
| Glyceride monoalkoxylates | Rewoderm ® LI63 (coconut fatty acid monoglyceride ethoxylate, n = 30) | 4.0 |
| Alkylphenol ethoxylates | Rewopal ® HV25 (nonylphenol ethoxylate, n = 25) | 1.6 |
| Ethoxylated sorbitan esters | TEGO ® SML20 (PEG20 sorbitan monolaurate) | 4.9 |
| Amphoteric surfactants | | |
| Amphoacetates | Rewoteric ® AM C (cocoamphoacetate, Na) | 3.5 |
| Amphodiacetates | Rewoteric ® AM 2C NM (cocoamphodiacetate, Na) | 3.8 |
| Glycinates | Rewoteric ® AM TEG (tallow glycinate) | 3.6 |
| Amphopropionates | Rewoteric ® AM KSF 40 (cocoamphopropionate, Na) | 4.2 |
| Sultaines | Rewoteric ® AM CAS (cocamidopropyl hydroxyl sultaine) | 4.0 |
| Amine oxides | Rewominox ® L408 (lauryl dimethylamine oxide) | 2.8 |
| Betaines | TEGO ® Betain F50 (cocamidopropyl betaine) | 0.8 |

Characterization of Surfactants:

Rewopol® NLS 28 (28% by weight dodecyl sulfate, Na) available from Degussa

Hostapur® SAS30 (30% by weight C14/17 alkyl sulfate, Na) available from Clariant Reworyl® NKS 50 (50% by weight C10/C13 alkylbenzenesulfonate, Na, 50% by weight water) available from Degussa Berol® 522 (45% by weight decyl phosphate, K) available from Akzo Nobel Hostaphat® OPS (100% by weight octylphosphonic acid) available from Clariant Rewopol® SB DO 75 (75% by weight diethylhexylsulfosuccinate, Na) available from Degussa Rewopol® SB FA 30 (40% by weight laurylethoxysulfosuccinate, Na) available from Degussa Hostapur® OS (42% by weight C14/16 α-olefinsulfonate, Na) available from Clariant Hostapon® SCI 85C (85% by weight coconut fatty acid isethionate, Na) available from Clariant Hostapon® CT (30% by weight coconut fatty acid methyltauride, Na) available from Clariant Rewoquat® CPEM (100% by weight cocopentaethoxymethylammonium methosulfate) available from Degussa Adogen® 444-29 (29% by weight cetyl trimethylammonium chloride) available from Degussa Rewopal® LA10-80 (75% by weight lauryl alcohol ethoxylate, n=10) available from Degussa Rewoderm® LI63 (100% by weight coconut fatty acid monoglyceride ethoxylate, n=30) from Degussa Rewopal® HV25 (100% by weight nonylphenol ethoxylate, n=25) available from Degussa TEGO® SML20 (100% by weight PEG20 sorbitan monolaurate) available from Degussa Rewoteric® AM C (25% by weight cocoamphoacetate, Na) available from Degussa Rewoteric® AM 2C NM (40% by weight cocoamphodiacetate, Na) available from Degussa Rewoteric® AM TEG (40% by weight tallow glycinate) available from Degussa Rewoterice AM KSF 40 (40% by weight cocoamphopropionate, Na) available from Degussa Rewoteric® AM CAS (40-45% by weight cocamidopropyl hydroxyl sultaine) available from Degussa Rewominox® L408 (30% by weight lauryl dimethylamine oxide) available from Degussa TEGO® Betain F50 (38% by weight cocamidopropylbetaine) available from Degussa.

The viscosities which result—for comparison—when 5% by weight DPG is added, with the ratio of polyethersiloxane A and water as in Table X, are as follows.

TABLE XI

Mixture of the polyethersiloxanes and water in the ratio of the surfactant serial experiments in Table X with 5% by weight added DPG

| Polyethersiloxane | Amount of polyethersiloxane [% by weight] | Amount of water [% by weight] | Amount of DPG [% by weight] | Viscosity (at 1 s$^{-1}$) [Pa · s] |
|---|---|---|---|---|
| A | 50 | 45 | 5 | 18.3 |

It is apparent that for each of the surfactant groups listed (anionic, cationic, nonionic, amphoteric) it is possible to find examples for which the viscosity in the blend with water and the surfactant is below the viscosity of 5 Pa·s. In principle it is not possible to except any organic surfactant groups. A comparison with DPG (Table XI) shows again the much lower fall in the viscosity as a result of using an organic solvent.

Determination of the Viscosity

All of the viscosities reported in the present description, unless otherwise indicated, were determined as follows.

The viscosity was measured in a rotational experiment at 25° C. with a shear rate of 1 s$^{-1}$ using an MCR301 rotational viscometer from Physica (Anton Paar, Ostfildern, Germany). Samples with a viscosity >100 mPa·s were measured using a cone/plate geometry (diameter=50.0 mm, angle=0.981°). Samples with a viscosity <100 mPa·s were investigated using a Couette geometry–measuring element diameter=26.66 mm, measuring beaker diameter=28.93 mm, measuring slot width=1.135 mm, measuring slot length=40.014 mm. Since some samples showed structural viscosity characteristics, the samples were first sheared at 1000 s$^{-1}$ for 60 seconds in order to create controlled initial conditions. Thereafter the samples were left for 10 minutes without shearing. During this time it was possible for the structure to develop again. After that the viscosity was measured at a shear rate of 1 s$^{-1}$. For this measurement, shearing was carried out for up to 10 minutes, until an equilibrium was reached. Samples which did not show structural viscosity characteristics were measured directly at 1 s$^{-1}$, without pretreatment, until the equilibrium was reached.

Having thus described in detail various embodiments of the present invention, it is to be understood that the invention defined by the above paragraphs is not to be limited to particular details set forth in the above description as many apparent variations thereof are possible without departing from the spirit or scope of the present invention.

What is claimed is:

1. A low-viscosity aqueous hot-cure flexible polyurethane foam stabilizer solution which has a viscosity of $\geq$100 mPa·s to $\leq$5000 mPa·s and is for the production of hot-cure flexible polyurethane foams, wherein the low-viscosity aqueous hot-cure flexible polyurethane foam stabilizer solution comprises the following components:

$\geq$40% to $\leq$70% by weight of polyethersiloxane,
$\geq$0.5% to $\leq$20% by weight of organic surfactant,
$\geq$10% by weight of water,
$\geq$0% by weight of organic solvent additions,
in which the polyethersiloxane has the following formula (I)

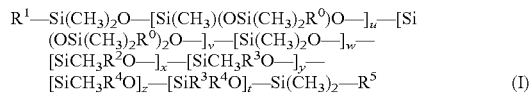

in which
$R^0$=—O—[Si(CH$_3$)$_2$O—]$_w$—[SiCH$_3$R$^2$O—]$_x$—[SiCH$_3$R$^3$O—]$_y$—[SiCH$_3$R$^4$O]$_z$—Si(CH$_3$)$_2$—R$^5$,
$R^1$, $R^2$, $R^3$, $R^4$ and $R^5$=identically to or differently from one another in each case an alkyl or aryl radical of 1 to 12 carbon atoms or in each case —CH$_2$—R$^6$ or —CH$_2$—CH$_2$—R$^6$ or polyalkylene oxide polyether of the formula (II)

$R^6$=H, —C$_6$H$_5$, —CN, -alkyl with C$_1$ to C$_{10}$, —CH—CH$_2$O (epoxide ring), -alkyl-OH, -aryl-OH, —Cl, —OH, —R$^8$—O—R$^9$, —R$^8$—O—CO—R$^9$ or a divalent bridge to a further siloxane radical, selected from the group consisting of alkylene, —R$^8$—O—R$^9$—, —R$^8$—COO—R$^9$, —R$^8$—O—R$^9$—O—R$^8$—, —R$^8$—COO—R$^9$—OOC—R$^8$—, —R$^8$—OOC—R$^9$—COO—R$^8$—,
$R^7$=H, alkyl, acyl, acetyl or aryl radical, alkyl- or arylurethane group or a diva lent bridge to a further siloxane radical, selected from the group consisting of alkylene, —R$^8$—O—R$^9$—, —R$^8$—COO—R$^9$, —R$^8$—O—R$^9$—O—R$^8$—, —R$^8$—COO—R$^9$—OOC—R$^8$—, —R$^8$—OOC—R$^9$—COO—R$^8$—,
$R^8$=alkyl- or aryl-,
$R^9$=alkyl- or aryl-,
u=0 to 5,
v=0 to 5,
t=0 to 15,
w=15 to 130,
x=0 to 15,
y=0 to 15,
z=0 to 15,
m=0 to 4,
a=$\geq$0 to $\leq$160,
b=$\geq$0 to $\leq$140,
c=$\geq$0 to $\leq$50,
g=$\geq$0 to $\leq$50,
d=0 to $\leq$50, it being the case that a+b+c+d+g$\geq$10,
wherein at least one polyether unit has an average molar mass, $M_n \geq$2100 g/mol;
with the proviso that x+y+z+t$\geq$3, and that at least one substituent $R^1$, $R^2$, $R^3$, $R^4$, and $R^5$ is a polyether of the formula II, the weight fraction of the aforementioned components being selected such that the overall weight fraction of the components does not exceed 100% by weight, based on the hot-cure flexible polyurethane foam stabilizer solution.

2. The hot-cure flexible polyurethane foam stabilizer solution as claimed in claim 1, wherein for the polyethersiloxane
t=2 to 15, and/or
u=0 to 4, and/or
v=0 to 4, and/or
w=50 to 100, and/or
x=2 to 15, and/or
y=2 to 15, and/or
z=2 to 15, and/or
a=1 to 105, and/or
b=1 to 105, and/or
c=1 to 40, and/or
d=1 to 40, and/or
g=1 to 40, and/or
m=1 to 4.

3. The hot-cure flexible polyurethane foam stabilizer solution as claimed in claim 1, wherein the polyethersiloxane has the following formula (III):

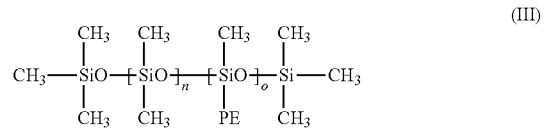

in which
n=50 to 120,
o=3 to 20, and
PE has the following formula IV:

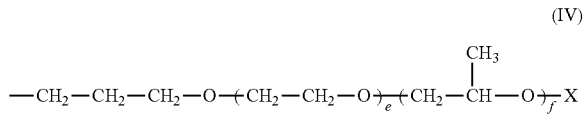

in which
X =H, alkyl, acyl, acetyl or aryl radical,
e $\geq$0-100,
f $\geq$0-120, where e+f$\geq$15.

4. The hot-cure flexible polyurethane foam stabilizer solution as claimed in claim 1, wherein $R^1$ and $R^5$ =identically to or differently from one another in each case methyl, ethyl or propyl; and/or m =2 or 3.

5. The hot-cure flexible polyurethane foam stabilizer solution as claimed in claim 1, wherein the polyether units have a molar mass of 500 g/mol to 7000 g/mol.

6. The hot-cure flexible polyurethane foam stabilizer solution as claimed in claim 1, wherein the fraction of ethylene oxide in the polyether unit is 10% to 100% by weight or the fraction of propylene oxide in the polyether unit is 10% to 100% by weight.

7. The hot-cure flexible polyurethane foam stabilizer solution as claimed in claim 1, wherein the propylene oxide fraction, averaged over all the polyether units of the polyethersiloxane, is 40% to 90% by weight.

8. The hot-cure flexible polyurethane foam stabilizer solution as claimed in claim 1, wherein the polyethersiloxanes have a molecular weight of 10,000 g/mol to 50,000 g/mol.

9. The hot-cure flexible polyurethane foam stabilizer solution as claimed in claim 1, wherein the hot-cure flexible polyurethane foam stabilizer solution comprises:
≧42% to ≦68% by weight of polyethersiloxane,
≧1% to ≦10%, by weight of organic surfactant,
≧15% to ≦55%, by weight of water, and
≧0% to ≦15%, by weight of organic solvent additions.

10. The hot-cure flexible polyurethane foam stabilizer solution as claimed in claim 1, wherein the hot-cure flexible polyurethane foam stabilizer solution comprises:
≧45% to ≦55%, by weight of polyethersiloxane,
≧1% to ≦10% by weight of alkylbenzenesulfonate,
≧30% to ≦50% by weight of water, and
≧1% to ≦10% by weight of dipropylene glycol.

11. The hot-cure flexible polyurethane foam stabilizer solution as claimed in claim 1, wherein the hot-cure flexible polyurethane foam stabilizer solution has a viscosity of ≧100 mPa·s to ≦5000 mPa·s.

12. The hot-cure flexible polyurethane foam stabilizer solution as claimed in claim 1, wherein the hot-cure flexible polyurethane foam stabilizer solution is a transparent solution.

13. The hot-cure flexible polyurethane foam stabilizer solution as claimed in claim 1, wherein the hot-cure flexible polyurethane foam stabilizer solution is storage-stable at room temperature and over a period of at least 14 days no phase separation and/or precipitation occurs.

14. The hot-cure flexible polyurethane foam stabilizer solution as claimed in claim 1, wherein the hot-cure flexible polyurethane foam stabilizer solution has a cloud point of ≧40° C.

15. The hot-cure flexible polyurethane foam stabilizer solution as claimed in claim 1, wherein the organic surfactant is selected from the group consisting of anionic surfactants, cationic surfactants, nonionic surfactants, amphoteric surfactants, an organic sulfate, sulfonate surfactant, and alkylbenzenesulfonate.

16. The hot-cure flexible polyurethane foam stabilizer solution as claimed in claim 1, wherein the anionic surfactant is selected from the group consisting of alkyl sulfates, fatty alcohol sulfates, secondary alkyl sulfates, paraffinsulfonates, alkyl ether sulfates, alkyl polyglycol ether sulfates, arylsulfonate, fatty alcohol ether sulfates, alkylbenzenesulfonates, alkylphenol ether sulfates, alkyl phosphates, phosphoric mono-, di-, tri-esters, alkyl ether phosphates, ethoxylated fatty alcohol phosphoric esters, phosphonic esters, sulfosuccinic diesters, sulfosuccinic monoesters, ethoxylated sulfosuccinic monoesters, sulfosuccinamides, α-olefinsulfonates, alkyl carboxylates, alkyl ether carboxylates, alkyl polyglycol carboxylates, fatty acid isethionate, fatty acid methyltauride, fatty acid sarcoside, arylsulfonates, naphthalenesulfonates, alkyl glyceryl ether sulfonates, polyacrylates, and α-sulfo fatty acid esters.

17. The hot-cure flexible polyurethane foam stabilizer solution as claimed in claim 1, wherein the cationic surfactant is selected from the group consisting of ester quats, di(tallow fatty acid amidoethyl)methylpolyethoxyammonium methosulfate, diamidoamine quats, alkyloxyalkyl quats, cocopentaethoxymethylammonium methosulfate, and trialkyl quats, cetyltrimethylammonium chloride.

18. The hot-cure flexible polyurethane foam stabilizer solution as claimed in claim 1, wherein the nonionic surfactant is selected from the group consisting of alcohol ethoxylates, fatty alcohol polyglycol ethers, fatty acid ethoxylates, fatty acid polyglycol esters, glyceride monoalkoxylates, alkanolamides, fatty acid alkylolamides, ethoxylated alkanolamides, fatty acid alkylolamido-ethoxylates, imidazolines, ethylene oxide-propylene oxide block copolymers, alkylphenol ethoxylates, alkylglucosides, ethoxylated sorbitan esters and amine alkoxylates.

19. The hot-cure flexible polyurethane foam stabilizer solution as claimed in claim 1, wherein the amphoteric surfactant is selected from the group consisting of amphoacetates, amphodiacetates, glycinates, amphopropionates, sultaines, amine oxides and betaines.

20. The hot-cure flexible polyurethane foam stabilizer solution as claimed in claim 1, wherein the hot-cure flexible polyurethane foam stabilizer solution comprises as additional additive at least one saltlike compound from the group consisting of organic and inorganic salts in a fraction of ≧0% to ≦5% by weight;
wherein
the cations are selected from the group consisting of alkali metal salts, alkaline earth metal salts, lithium salts, sodium salts, potassium salts, ammonium salts, substituted ammonium salts, mono-, di-, and tri-ethanolamine salts, and
the anions are selected from the group consisting of the sulfates, halides, carboxylates, benzoates and lactates.

21. The hot-cure flexible polyurethane foam stabilizer solution as claimed in claim 1, wherein the hot-cure flexible polyurethane foam stabilizer solution comprises as additional additive at least one polyhydroxy-functional compound possessing a functionality ≧3, the polyhydroxy-functional compound being selected from the group consisting of glycerol, trimethylolpropane, pentaerythritol, low molecular mass carbohydrates, and high molecular mass carbohydrates, and the fraction of the polyhydroxy-functional additives being ≧0% to ≦10% by weight, based on the hot-cure flexible polyurethane foam stabilizer solution.

22. The hot-cure flexible polyurethane foam stabilizer solution as claimed in claim 1, wherein the solution contains at least one additive selected from the group consisting of catalysts, blowing agents, biocides, antioxidants, buffer substances, and flame retardants.

23. A hot-cure flexible polyurethane foam stabilizer blend comprising amine, polyol and/or water, the hot-cure flexible polyurethane foam stabilizer blend having at least 40% by weight of hot-cure flexible polyurethane foam stabilizer solution, based on the total weight of the hot-cure flexible polyurethane foam stabilizer blend, as claimed in claim 1.

24. A method of using the hot-cure flexible polyurethane foam stabilizer solution as claimed in claim 1 or of the hot-cure flexible polyurethane foam stabilizer blend of claim 23 in the production of hot-cure flexible polyurethane foams wherein said solution or blend is included in producing the hot-cure flexible polyurethane foam.

25. The hot-cure flexible polyurethane foam stabilizer solution as claimed in claim 2, wherein for the polyethersiloxane
t =4 to 13, and/or
u =1, 2 or 0, and/or
v =1, 2 or 0, and/or
w =55 to 90, and/or
x =4 to 13, and/or
y =4 to 13, and/or
z =4 to 13, and/or
a =5 to 100, and/or
b =5 to 100, and/or
c =2 to 30, and/or
d =2 to 30, and/or
g =2 to 30, and/or
m =2 to 3.

26. The hot-cure flexible polyurethane foam stabilizer solution as claimed in claim 25, wherein for the polyethersiloxane
w =60 to 85, and/or
a =10 to 90, and/or
b =10 to 90, and/or
c =2 to 20, and/or
d =2 to 20, and/or
g =2 to 20.

27. The hot-cure flexible polyurethane foam stabilizer solution as claimed in claim 2, wherein for the polyethersiloxane
t =0, and/or
u =0, and/or
v =0, and/or
w =60 to 85, and/or
x =0, and/or
y =0, and/or
z =0, and/or
a =10 to 90, and/or
b =10 to 90, and/or
c =0, and/or
d =0, and/or
g =0, and/or
m =2 to p3.

28. The hot-cure flexible polyurethane foam stabilizer solution as claimed in claim 3, wherein the polyethersiloxane has the following formula (III):

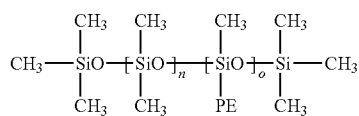

in which
n=60 to 100,
o=3.5 to 18, and
PE has the following formula IV:

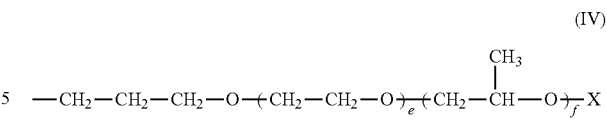

in which
X =H, alkyl, acyl, acetyl or aryl radical,
e 1 to 50,
f 1 to 50, where e+f ≧15.

29. The hot-cure flexible polyurethane foam stabilizer solution as claimed in claim 28, wherein the polyethersiloxane has the following formula (III):

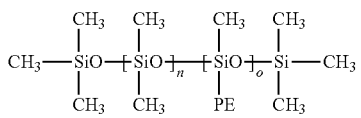

in which
n =65 to 90,
o =4 to 15, and
PE has the following formula IV:

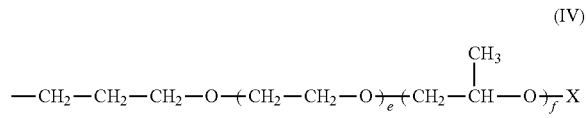

in which
X =H, alkyl, acyl, acetyl or aryl radical,
e 5 to 30,
f 10 to 30, where e+f ≧15.

30. The hot-cure flexible polyurethane foam stabilizer solution as claimed in claim 4, wherein $R^1$ and $R^5$ =identically to or differently from one another is in each case methyl.

31. The hot-cure flexible polyurethane foam stabilizer solution as claimed in claim 9, wherein the hot-cure flexible polyurethane foam stabilizer solution comprises:
50% to 60% by weight of polyethersiloxane,
≧4% to ≦6%, by weight of organic surfactant,
≧30% to ≦40%, by weight of water, and
≧2% to ≦5%, by weight of antifreeze agents.

32. The hot-cure flexible polyurethane foam stabilizer solution as claimed in claim 10, wherein the hot-cure flexible polyurethane foam stabilizer solution comprises:
≧45% to ≦55% by weight of polyethersiloxane,
≧2% to ≦8% by weight of alkylbenzenesulfonate,
≧35% to ≦45% by weight of water, and
≧3% to ≦7% by weight of dipropylene glycol.

* * * * *